United States Patent
Umahashi et al.

(10) Patent No.: US 12,131,872 B2
(45) Date of Patent: Oct. 29, 2024

(54) ELECTROLYTIC CAPACITOR AND METHOD FOR PRODUCING SAME

(71) Applicant: Panasonic Intellectual Property Management Co., Ltd., Osaka (JP)

(72) Inventors: Naoki Umahashi, Osaka (JP); Masatoshi Takeshita, Osaka (JP); Hitoshi Fukui, Nara (JP); Makoto Nagashima, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/756,542

(22) PCT Filed: Dec. 22, 2020

(86) PCT No.: PCT/JP2020/047889
§ 371 (c)(1),
(2) Date: May 26, 2022

(87) PCT Pub. No.: WO2021/132223
PCT Pub. Date: Jul. 1, 2021

(65) Prior Publication Data
US 2022/0415581 A1    Dec. 29, 2022

(30) Foreign Application Priority Data

Dec. 24, 2019 (JP) .................................. 2019-233574
Nov. 26, 2020 (JP) .................................. 2020-195906

(51) Int. Cl.
*H01G 9/02* (2006.01)
*H01G 9/028* (2006.01)
*H01G 9/15* (2006.01)

(52) U.S. Cl.
CPC ............... *H01G 9/028* (2013.01); *H01G 9/15* (2013.01)

(58) Field of Classification Search
CPC .................................. H01G 9/028; H01G 9/15
See application file for complete search history.

(56) References Cited

U.S. PATENT DOCUMENTS 6,128,180 A * 10/2000 Araki ....................... H01G 9/15
                                                          361/524
6,421,227 B2 * 7/2002 Nitoh ..................... H01G 9/028
                                                          361/523
(Continued)

FOREIGN PATENT DOCUMENTS

CN     1422432 A    6/2003
CN   102522221 A    6/2012
(Continued)

OTHER PUBLICATIONS

International Search Report of PCT application No. PCT/JP2020/047889 dated Mar. 16, 2021.
(Continued)

*Primary Examiner* — Dion R. Ferguson
(74) *Attorney, Agent, or Firm* — Rimon P.C.

(57) ABSTRACT

An electrolytic capacitor includes at least one capacitor element. The at least one capacitor element includes: an anode body including an anode lead portion, and a cathode forming portion; a dielectric layer disposed on at least a surface of the cathode forming portion of the anode body; and a cathode part covering at least a part of the dielectric layer. The cathode part includes a solid electrolyte layer that contains a conductive polymer, and covers at least a part of the dielectric layer. A ratio T1/T2 of a thickness T1 of the solid electrolyte layer formed at a corner portion of the anode body to a thickness T2 of the solid electrolyte layer formed at a center portion of a principal surface of the anode (Continued)

body is in a range from 0.8 to 1.7, inclusive, in a cross section of the at least one capacitor element.

15 Claims, 2 Drawing Sheets

(56) References Cited

U.S. PATENT DOCUMENTS

| | | | | |
|---|---|---|---|---|
| 6,430,032 | B2* | 8/2002 | Sakai | H01G 9/0036 |
| | | | | 29/25.03 |
| 7,190,572 | B2* | 3/2007 | Maeda | H01G 9/15 |
| | | | | 29/25.03 |
| 2002/0015277 | A1* | 2/2002 | Nitoh | H01G 9/028 |
| | | | | 361/523 |
| 2002/0141141 | A1* | 10/2002 | Nitoh | H01G 9/15 |
| | | | | 361/523 |
| 2008/0049381 | A1* | 2/2008 | Saida | H01G 9/0036 |
| | | | | 29/25.03 |
| 2010/0254072 | A1* | 10/2010 | Nobuta | H01G 9/0036 |
| | | | | 427/80 |
| 2012/0044615 | A1* | 2/2012 | Takahashi | H01G 9/0036 |
| | | | | 29/25.03 |
| 2014/0079875 | A1* | 3/2014 | Takahashi | H01G 9/025 |
| | | | | 427/80 |
| 2015/0183925 | A1* | 7/2015 | Naito | C25D 9/02 |
| | | | | 526/256 |
| 2017/0098510 | A1* | 4/2017 | Uka | H01G 9/028 |
| 2021/0151258 | A1* | 5/2021 | Choi | H01G 9/0525 |
| 2021/0166886 | A1* | 6/2021 | Hong | H01G 9/15 |
| 2022/0415581 | A1* | 12/2022 | Umahashi | H01G 9/028 |

FOREIGN PATENT DOCUMENTS

| | | | | |
|---|---|---|---|---|
| DE | 10243795 A1 * | 5/2003 | | H01G 9/012 |
| JP | 2001-230156 | 8/2001 | | |
| JP | 2004186684 A * | 7/2004 | | H01G 9/0036 |
| JP | 2006-173593 | 6/2006 | | |
| JP | 2006173593 A * | 6/2006 | | H01G 11/48 |
| JP | WO2006085601 A1 * | 6/2008 | | |
| JP | 2010-245313 | 10/2010 | | |
| JP | 2012-043958 | 3/2012 | | |
| JP | 2012129293 A * | 7/2012 | | H01G 9/0036 |
| WO | WO-2004010446 A1 * | 1/2004 | | H01G 9/0029 |
| WO | WO-2007097364 A1 * | 8/2007 | | H01G 11/48 |
| WO | WO-2010038477 A1 * | 4/2010 | | H01G 9/0036 |
| WO | 2016/006236 | 1/2016 | | |
| WO | WO-2019044044 A1 * | 3/2019 | | C09D 125/18 |
| WO | WO-2019130677 A1 * | 7/2019 | | C08F 12/30 |

OTHER PUBLICATIONS

English Translation of Chinese Search Report dated Aug. 1, 2024 for the related Chinese Patent Application No. 202080087838.2.

* cited by examiner

FIG. 4

ELECTROLYTIC CAPACITOR AND METHOD FOR PRODUCING SAME

This application is a U.S. national stage application of the PCT International Application No. PCT/JP2020/047889 filed on Dec. 22, 2020, which claims the benefit of foreign priorities of Japanese patent application No. 2019-233574 filed on Dec. 24, 2019 and Japanese patent application No. 2020-195906 filed on Nov. 26, 2020, the contents all of which are incorporated herein by reference.

TECHNICAL FIELD

The present disclosure relates to an electrolytic capacitor that includes a solid electrolyte layer containing a conductive polymer, and a method for producing the electrolytic capacitor.

BACKGROUND

An electrolytic capacitor includes capacitor elements, an exterior body that seals the capacitor elements, and an external electrode electrically connected with the capacitor elements. The capacitor element includes an anode body, a dielectric layer, and a cathode part. The anode body having a first end and a second end includes an anode lead portion including the first end and a cathode forming portion including the second end. The dielectric layer is formed at least on a surface of the cathode forming portion in the anode body. The cathode part covers at least a portion of the dielectric layer. The cathode part includes a solid electrolyte layer and a cathode lead-out layer. The solid electrolyte layer covers at least a part of the dielectric layer and contains a conductive polymer. The cathode lead-out layer covers at least a part of the solid electrolyte layer. An electrolytic capacitor that includes a solid electrolyte layer containing a conductive polymer is also referred to as a solid electrolytic capacitor.

International publication WO 2016/006236 proposes a technique of interposing an intermediate layer including a cationic agent and an anionic agent between a first conductive polymer layer and a second conductive polymer layer. The cationic agent has a cationic group, and the anionic agent has a first anionic group and a second anionic group.

Unexamined Japanese Patent Publication No. 2012-43958 proposes a solid electrolytic capacitor that includes: a first solid electrolyte layer; a second solid electrolyte layer; and at least one continuous or discontinuous layer that is disposed between the first solid electrolyte layer and the second solid electrolyte layer as well as in the second solid electrolyte layer. The at least one continuous or discontinuous layer is made of an amine compound.

Unexamined Japanese Patent Publication No. 2010-245313 proposes a method for producing a solid electrolytic capacitor by forming an oxide film on a valve metal of an anode body, and forming a cathode in which a conductive polymer layer, a graphite layer, and a silver layer are sequentially formed on the oxide film. A method for forming the conductive polymer layer that contains a sulfonate ester compound includes: dissolving a nonionic surfactant having a hydroxy group in a conductive polymer solution or a dispersion liquid that contains a sulfonate oxide polymer compound as a dopant; coating the solution on the oxide film; and applying dehydration condensation to the solution by heating and drying.

Unexamined Japanese Patent Publication No. 2001-230156 proposes a laminated solid electrolytic capacitor. In the laminated solid electrolytic capacitor, an end of an anode base body forms an anode part. The anode base body having a flat shape is made of a valve metal. A dielectric oxide film layer is formed on a surface of the anode base body. A plurality of single-plate capacitor elements are laminated and fixed on an anode-side lead frame in a state where the anode parts are aligned in the same direction. In each of the plurality of single-plate capacitor elements, a solid electrolyte layer and a conductor layer are sequentially formed on the dielectric oxide film layer excluding the anode part to form a cathode part. A cathode part of the each of the plurality of single-plate capacitor elements is laminated and fixed on a cathode-side lead frame in a fan shape from an anode part side toward a distal end of the cathode part by forming an electrically conductive adhesive layer. Portions of a flat valve metal the anode base body of single-plate capacitor elements on which the solid electrolyte layer is formed are laminated substantially parallel to the cathode side lead frame.

SUMMARY

An electrolytic capacitor according to one aspect of the present disclosure, includes at least one capacitor element. The at least one capacitor element includes an anode body including an anode lead portion and a cathode forming portion, a dielectric layer disposed on at least a surface of the cathode forming portion of the anode body, and a cathode part covering at least a part of the dielectric layer. The anode body has a sheet shape. The anode body includes a first end and a second end. The anode lead portion includes the first end, and the cathode forming portion includes the second end. The cathode part includes a solid electrolyte layer containing a conductive polymer, the solid electrolyte layer covering at least a part of the dielectric layer. A ratio $T1/T2$ of a thickness $T1$ of the solid electrolyte layer formed at a corner portion of the anode body to a thickness $T2$ of the solid electrolyte layer formed at a center portion of a principal surface of the anode body is in a range from 0.8 to 1.7, inclusive, in a cross section of the at least one capacitor element at an arbitrary position in a first end side portion of the cathode part. The cross section is perpendicular to a direction directed from the first end to the second end.

A method for producing an electrolytic capacitor according to another aspect of the present disclosure includes the following first to fifth steps. The first step is preparing an anode body. The second step is forming a dielectric layer on a surface of the anode body. The third step is treating the anode body with a first treatment solution that contains a first conductive polymer or a precursor of the first conductive polymer, the anode body having the dielectric layer. The fourth step is treating the anode body with a second treatment solution containing a surface conditioner, the anode body being already treated by the first treatment solution. The fifth step is treating the anode body with a third treatment solution containing a second conductive polymer, the anode body being already treated by the second treatment solution.

It is possible to prevent thinning of the thickness of the solid electrolyte layer formed at the corner portion of the anode body.

DESCRIPTION OF EMBODIMENT

In the conventional technique, there is a tendency where a film thickness of a solid electrolyte layer formed at a corner portion of a principal surface of an anode body is smaller than a film thickness of the solid electrolyte layer in the vicinity of the center portion of the principal surface of the anode body. There may also be a case where a portion that is not covered with the solid electrolyte layer is formed at the corner portion of the anode body.

A treatment solution containing a conductive polymer has a relatively high surface tension. Thus, it is difficult to uniformly wet the entire surface of a cathode forming portion of an anode body with the treatment solution. As a result, it is difficult to form a solid electrolyte layer having a uniform thickness on the surface of the cathode forming portion. As the anode body, in general, a sheet-shaped anode body such as a metal foil or a sintered body is used. When the sheet-shaped anode body is treated using a treatment solution containing a conductive polymer, a solid electrolyte layer having a relatively uniform thickness is formed on an area in the vicinity of the center portion of a principal surface of the sheet. However, it is difficult to make the treatment solution adhere to corner portions of the sheet as compared with the area in the vicinity of the center portion of the principal surface of the sheet. Thus, at the corner portion of the sheet, the thickness of the solid electrolyte layer is decreased, or a portion to which the conductive polymer does not adhere is formed. When the portion to which the conductive polymer does not adhere is formed, short-circuiting is likely to occur. Accordingly, product defects occur and thus, a yield of products is decreased.

According to the present disclosure, an electrolytic capacitor is produced by a producing method that includes: a step of treating the anode body on which the dielectric layer is formed using a first treatment solution that contains a first conductive polymer or a precursor of the first conductive polymer: a step of treating the anode body that is already treated by the first treatment solution using a second treatment solution containing a surface conditioner; and a step of treating the anode body that is already treated by the second treatment solution using a third treatment solution that contains a second conductive polymer. In this manner, by treating the anode body using the second treatment solution that contains the surface conditioner and, thereafter, by treating the anode body using the third treatment solution that contains the second conductive polymer, it is possible to make the second conductive polymer adhere not only to the area in the vicinity of the center portion of the principal surface of the anode body but also to the corner portions of the anode body. Accordingly, it is possible to suppress the decrease of the thickness of the solid electrolyte layer formed at the corner portions of the anode body.

The followings are considered as the reasons why the decrease of the thickness of the solid electrolyte layer formed at the corner portion of the anode body is suppressed. First, with the use of the second treatment solution that contains the surface conditioner, the second treatment solution can be spread, in the cathode forming portion, over the entire surface of the anode body. As a result, the component of the second treatment solution such as the surface conditioner adheres to the entire surface of the cathode forming portion. By treating the anode body using the third treatment solution containing the second conductive polymer in such a state, the third treatment solution can be spread over the entire surface of the cathode forming portion. With such processing, on the surface of the cathode forming portion, it is possible to suppress the aggregation of the second conductive polymer in the vicinity of the center portion of the principal surface of the anode body. As a result, the solid electrolyte layer having an appropriate thickness can be formed not only on the area in the vicinity of the center portion of the principal surface of the anode body but also at corner portions of the principal surface of the anode body. Accordingly, the nonuniformity in thickness can be suppressed.

In this manner, according to the present disclosure, a ratio of the thickness of the solid electrolyte layer formed at the corner portion of the anode body to the thickness of the solid electrolyte layer formed on the area in the vicinity of the center portion of the principal surface can be increased as compared with a corresponding ratio in the prior art.

More specifically, in the electrolytic capacitor of the present disclosure, the ratio T1/T2 of the thickness T1 of the solid electrolyte layer formed at the corner portion of the anode body to the thickness T2 of the solid electrolyte layer formed at the center portion of the principal surface of the anode body is in a range from 0.8 to 1.7, inclusive. In this manner, in the electrolytic capacitor of the present disclosure, the decrease of the thickness of the solid electrolyte layer formed at the corner portion of the anode body is suppressed. Further, the solid electrolyte layer is formed to have more uniform thickness in the entire surface of the cathode forming portion of the anode body. As a result, product defects caused by short-circuiting are reduced. Further, the lowering of electrostatic capacitance and the increase of equivalent series resistance (ESR) and a dielectric dissipation factor tan δ are also suppressed while suppressing the excessive increase of a leakage current. Accordingly, the quality of the electrolytic capacitor is further stabilized.

In order to suppress nonuniformity in the thickness of the solid electrolyte layer, it is considered that it is important to spread the third treatment solution that contains the second conductive polymer over the entire surface of the cathode forming portion of the anode body. In view of the above, it is also conceivable to add a surface conditioner to the third treatment solution in order to lower a surface tension of the third treatment solution. However, even when a surface conditioner is actually added to the third treatment solution, it has been found that an effect of suppressing the decrease of the thickness of the solid electrolyte layer at the corner portion is small. Further, since the third treatment solution usually contains various additive agents in addition to the second conductive polymer, a pot life of the third treatment solution may be shortened when the surface conditioner is added to the third treatment solution. According to the present disclosure, by using the second treatment solution that contains the surface conditioner, a good pot life of the third treatment solution can be ensured unlike the case where a surface conditioner is added to the third treatment solution that contains a conductive polymer. From such a viewpoint, it is preferable that the second treatment solution not contain a conductive polymer.

The electrolytic capacitor includes at least one capacitor element. The capacitor element includes an anode body, a dielectric layer, and a cathode part. The anode body has an anode lead portion and a cathode forming portion. The anode lead portion has a first end of the anode body, and the cathode forming portion has a second end of the anode body. The dielectric layer is formed on a surface of at least the cathode forming portion of the anode body. The cathode part covers at least a portion of the dielectric layer. Usually, the anode body has a sheet shape. The cathode part has a solid electrolyte layer that covers at least a portion of the dielectric layer and contains a conductive polymer. The thicknesses T1 and T2 described above are obtained in a cross section of the capacitor element at arbitrary position of the first end side portion of the cathode part. The cross section is perpendicular to a direction from the first end to the second end. Hereinafter, this cross section may be simply referred to as a cross section G. More specifically, the thickness T1 is obtained by averaging the measured thicknesses of the solid electrolyte layers formed at four corner portions of the anode body in the cross section G. First, in the cross section G, a straight line that pass a vertex of each corner portion of the anode body is drawn at an angle of 45° with respect to a line extending a line segment that corresponds to the principal surface of the anode body toward the outside. Then, a distance between a point at which this straight line intersects with an outer periphery of the solid electrolyte layer and the vertex of the corresponding corner portion is defined as the thickness of the solid electrolyte layer formed at each corner portion. The thickness T2 is obtained by averaging the measured thicknesses of the solid electrolyte layers formed at the center portions of the pair of principal surfaces of the anode body in the cross section G. First, in the cross section G, a center line that passes middle points of line segments that respectively correspond to the pair of principal surfaces of the anode body is drawn. Then, a distance between a point at which the center line intersects with an outer periphery of the solid electrolyte layer and the corresponding middle point is defined as the thickness of the solid electrolyte layer formed at the center portion of the each principal surface.

The direction directed from the first end toward the second end is defined as the direction parallel to a straight line that connects the center of an end surface of the first end to the center of an end surface of the second end. Hereinafter, this direction may be referred to a length direction of the anode body or a length direction of the capacitor element. The cross section G is a cross section of a portion of the capacitor element where the cathode part is formed. The cross section G is a cross section, which is perpendicular to the length direction of the capacitor element, at an arbitrary position between a position at a half of the length of the cathode part and an end of the cathode part at a side close to the first end in the direction parallel to the length direction of the capacitor element. The cross section of the capacitor element can be observed by an optical microscope, for example.

The solid electrolyte layer may include: a first layer that covers at least a part of the dielectric layer and contains a first conductive polymer; a second layer that covers at least a part of the first layer and contains a second conductive polymer; and at least one continuous or discontinuous layer that is interposed between the first layer and the second layer. In the present embodiment, the continuous or discontinuous layer contains a surface conditioner. In such a solid electrolyte layer, it is considered that the surface conditioner is unevenly distributed between the first layer and the second layer. By interposing the surface conditioner between the first layer and the second layer, the entire surface of the cathode forming portion of the anode body can be easily covered by the second layer. Accordingly, it is possible to suppress a decrease in the thickness of the solid electrolyte layer formed at the corner portion of the anode body. As a result, nonuniformity in the thickness of the solid electrolyte layer are suppressed.

It is sufficient that the surface conditioner be interposed at least between the first layer and the second layer. In a portion where the dielectric layer is not covered by the first layer, a surface conditioner may be interposed between the dielectric layer and the second layer. It is sufficient that the surface conditioner be distributed so as to cover the entire surface of the cathode forming portion of the anode body. Thus, the layer that contains the surface conditioner is not necessarily formed as a continuous layer, and may be formed as a discontinuous layer. A part of the layer that contains a surface conditioner may be embedded in the first layer. It is sufficient that at least one layer that contains a surface conditioner be interposed between the first layer and the second layer. Meanwhile, two or more such layers may be interposed between the first layer and the second layer.

Hereinafter, the solid electrolytic capacitor according to the present disclosure and a method for producing such a solid electrolytic capacitor will be described more specifically with reference to the drawings when necessary.

[Electrolytic Capacitor]

(Anode Body)

The anode body may contain valve metal, an alloy that contains valve metal, a compound that contains valve metal, and the like. These materials may be used singly or in combination of two or more kinds of these materials. As the valve metal, for example, aluminum, tantalum, niobium, and titanium are preferably used.

The shape of the anode body is usually a sheet shape. The sheet shape includes a foil shape and a plate shape. The sheet-shaped anode body includes a pair of principal surfaces. A corner portion exists between each principal surface and each end surface of the anode body.

The anode body includes an anode lead portion, and a cathode forming portion. The anode lead portion has a first end of the anode body, and the cathode forming portion has a second end of the anode body which is opposite to the first end. A cathode part including the solid electrolyte layer is formed on a surface of the cathode forming portion of the anode body.

Usually, the anode body includes a porous portion on a surface layer of at least the cathode forming portion. The porous portion is formed on the surface layer by roughening a surface of at least a portion of a base material (for example, a sheet-shaped base material) that contains a valve metal that corresponds to at least the cathode forming portion. The porous portion may be formed on a surface layer of the anode lead portion. The anode body may be a molded body of particles that contain valve metal or a sintered body of the molded body. The sintered body has a porous structure and thus, the entire anode body may be the porous portion.

(Dielectric Layer)

The dielectric layer is an insulating layer that functions as a dielectric body formed so as to cover a surface of at least a part of the anode body.

It is sufficient that the dielectric layer be formed so as to cover at least a part of the anode body. The dielectric layer may be formed, for example, on a surface of at least the cathode forming portion of the anode body. The dielectric layer may be formed on a surface of the anode lead portion.

Usually, the dielectric layer is formed on the surface of the anode body. Since a porous portion is formed on the surface layer of the anode body, the dielectric layer is formed along inner wall surfaces of pores and cavities (pits) formed on the surface of the anode body, which include inner wall surfaces of pores of the porous portion.

The dielectric layer contains an oxide of valve metal. For example, when tantalum is used as valve metal, the dielectric layer contains $Ta_2O_5$. When aluminum is used as valve metal, the dielectric layer contains $Al_2O_3$. The dielectric layer is not limited such materials, and any material can be used for forming the dielectric layer provided that the material functions as a dielectric body.

(Cathode Part)

The cathode part includes at least a solid electrolyte layer that covers at least a portion of the dielectric layer. Usually, the cathode part is formed on the surface of the cathode forming portion of the anode body with the dielectric layer interposed between the cathode part and the cathode forming portion. The cathode part includes a solid electrolyte layer, and a cathode lead-out layer that covers at least a portion of the solid electrolyte layer. Hereinafter, the solid electrolyte layer and the cathode lead-out layer will be described.

(Solid Electrolyte Layer)

The solid electrolyte layer is formed so as to cover the dielectric layer. The solid electrolyte layer does not necessarily cover the entire dielectric layer (the entire surface of the dielectric layer), and it is sufficient that the solid electrolyte layer be formed so as to cover at least a part of the dielectric layer. The solid electrolyte layer includes, for example, a first layer that contains a first conductive polymer, a second layer that contains a second conductive polymer formed on the first layer, and a continuous or discontinuous layer that is interposed between the first layer and the second layer and contains a surface conditioner. When there is a region in which the first layer is not formed on the dielectric layer, the second layer may be formed on the dielectric layer in this region. The second layer may be formed on the dielectric layer with a layer that contains a surface conditioner interposed between the dielectric layer and the second layer.

(First Layer)

As the first conductive polymer, a known polymer used for an electrolytic capacitor such as a π-conjugated conductive polymer can be used. As the first conductive polymer, polymers where a basic skeleton is formed of polypyrrole, polythiophene, polyaniline, polyfuran, polyacetylene, polyphenylene, polyphenylenevinylene, polyacene, and/or polythiophenevinylene can be named. Among these polymers, for example, it is preferable to use polymer that adopts polypyrrole, polythiophene or polyaniline as a basic skeleton.

The above-mentioned polymer also includes a homopolymer, a copolymer of two or more kinds of monomers, and derivatives of these polymers (a substitute having a substituent group). For example, polythiophene includes poly(3,4-ethylenedioxythiophene) and the like.

One kind of first conductive polymer may be used alone, or two or more kinds of first conductive polymers may be used in combination.

A weight-average molecular weight (Mw) of the first conductive polymer is not particularly limited, and is, for example, in a range from 1,000 to 1,000,000, inclusive.

In the present specification, a weight-average molecular weight (Mw) is a weight average molecular weight in terms of polystyrene measured by gel permeation chromatography (GPC). Usually, GPC is measured using a polystyrene gel column and water/methanol (volume ratio: 8/2) that form a mobile phase.

The first layer may be a single layer or may be formed of a plurality of layers. When the first layer is formed of the plurality of layers, the first conductive polymers included in the respective layers may be equal or different from each other.

The first layer can further contain a dopant. As the dopant, for example, at least one selected from the group consisting of an anion and a polyanion is used.

As the anion, for example, a sulfate ion, a nitrate ion, a phosphate ion, a borate ion, an organic sulfonate ion, a carboxylic acid ion and the like can be named. Meanwhile, the anion is not particularly limited. As a dopant that generates sulfonate ions, for example, a para-toluenesulfonic acid, a naphthalenesulfonic acid and the like can be named.

As polyanion, for example, a polymer-type polysulfonic acid, and a polymer-type polycarboxylic acid and the like can be named. As a polysulfonic acid of a polymer type, a polyvinylsulfonic acid, a polystyrenesulfonic acid, a polyallylsulfonic acid, a polyacrylsulfonic acid, a polymethacrylsulfonic acid and the like can be named. As a polycarboxylic acid of a polymer type, a polyacrylic acid and a polymethacrylic acid can be named. Polyanion includes a polyester sulfonic acid, a phenolsulfonic acid novolak resin and the like. Meanwhile, the polyanion is not limited to such a kind.

When an anionic agent described later is used, from a viewpoint of easily suppressing dedoping, it is advantageous to use a dopant having a relatively high electron withdrawing property (for example, a sulfonic acid ion, and a polysulfonic acid of a polymer type) among dopants. Also from the viewpoint of allowing a solid electrolyte layer to easily secure high conductivity, it is preferable to use a sulfonate ion or a polysulfonic acid of a polymer type as a dopant.

Anion and polyanion may be contained in the first layer in the form of a salt. In the first layer, the anion and polyanion respectively may form a conductive polymer composite together with the first conductive polymer. For example, a sulfonic acid group may be contained in the first layer in a free form ($-SO_3H$), in an anion form ($-SO_3^-$), or in a salt form. A sulfonic acid group may be contained in the first layer in a form that the sulfonic acid group is bonded to a conductive polymer or interacts with the conductive polymer. In the present specification, the sulfonic acid groups in all these forms may be simply referred to as a "sulfonic acid group". In the same manner, a carboxy group may be contained in the first layer in a free form ($-COOH$), in an anion form ($-COO^-$), or in a salt form. A carboxy group may be contained in the first layer in a form that the carboxy group is bonded to the conductive polymer or interacts with the conductive polymer. In the present specification, the carboxy groups in all these forms may be simply referred to as a "carboxy group".

A content ratio of a dopant contained in the first layer may preferably range from 10 parts by mass to 1,000 parts by mass, inclusive, more preferably from 50 parts by mass to 200 parts by mass inclusive with respect to 100 parts by mass of the first conductive polymer, for example.

The first layer may further contain a water-soluble polymer. A dopant of a polymer type is also included in a water-soluble polymer. As the water-soluble polymer, it is preferable to use a component having the lower electron withdrawing property than the dopant. When the solid electrolyte layer contains a water-soluble polymer, the thickness of the solid electrolyte layer at the center portion of the principal surface of the anode body can be increased. Accordingly, nonuniformity in the thickness of the solid electrolyte layer can be further suppressed. Thus, the quality of the electrolytic capacitor is further stabilized. In addition, by increasing the thickness of the solid electrolyte layer on the principal surface of the anode body, a leakage current can be reduced and a withstand voltage can be enhanced while suppressing the increase in ESR and tan δ of the electrolytic capacitor.

As the water-soluble polymer, a water-soluble polymer compound that has a hydrophilic group in a main chain or a side chain can be named. As the hydrophilic group, a polyoxyalkylene chain, a hydroxy group, and an acid group (a carboxy group, a sulfonic acid group and the like) can be named. As the water-soluble polymer, for example, a polyalkylene glycol compound, a water-soluble polyurethane, a water-soluble polyamide, a water-soluble polyimide, a water-soluble acrylic resin, and polyvinyl alcohol can be named.

As the polyalkylene glycol compound, for example, a compound having a polyoxyalkylene chain can be named. The polyoxyalkylene chain may preferably be a polyoxy $C_{2-4}$ alkylene chain. The polyalkylene glycol compound may more preferably contain at least a polyoxyethylene chain. As the polyalkylene glycol compound, for example, hydroxy compounds such as a polyalkylene glycol (diethylene glycol, triethylene glycol, oligoethylene glycol, polyethylene glycol, oxyethylene-oxypropylene block copolymer, and the like), and a polyalkylene glycol having a substituent (a halogen atom, a hydroxy group or the like) (for example, polyalkylene glycol chlorohydrin or bromohydrin (diethylene glycol monochlorohydrin, triethylene glycol monochlorohydrin, oligoethylene glycol monochlorohydrin, polyethylene glycol monochlorohydrin, diethylene glycol monobromohydrin, triethylene glycol monobromohydrin, oligoethylene glycol monobromohydrin or the like)) can be named. The polyalkylene glycol compound also includes derivatives (for example, an ether compound, an ester compound, or an amide compound) of these hydroxy compounds.

As each of the water-soluble polyurethane, the water-soluble polyamide, and the water-soluble polyimide, for example, a polymer having an acid group (such as at least one selected from the group consisting of a carboxy group and a sulfonic acid group) in a side chain is named. In these water-soluble polymers, high water solubility is obtained by introducing a plurality of acid groups into the skeleton (main chain) of each polymer.

As the water-soluble acrylic resin, such a resin having a carboxy group in a side chain is preferable. As such a water-soluble acrylic resin, a polyacrylic acid, a polymethacrylic acid, an acrylic acid-methacrylic acid copolymer, and a copolymer of at least one selected from the group consisting of an acrylic acid and a methacrylic acid and another copolymerizable monomer can be named. As other copolymerizable monomers, for example, an acrylic acid ester (an alkyl ester, a hydroxyalkyl ester or the like), a methacrylic acid ester (an alkyl ester, a hydroxyalkyl ester, or the like), a vinyl compound (vinyl cyanide, olefin, an aromatic vinyl compound or the like), a polycarboxylic acid having a polymerizable unsaturated bond (a maleic acid, a fumaric acid or the like), and acid anhydrides of these materials can be named. The copolymer may include one kind or two or more kinds of monomer units derived from other copolymerizable monomers.

The first layer may contain one kind of water soluble polymer or two or more kinds of water soluble polymers.

The water-soluble polymer may also include a water-soluble polymer that has a function as a dopant. In a case where a dopant having a relatively high electron withdrawing property (for example, a sulfonic acid ion, a polysulfonic acid of a polymer type) such as a dopant containing a sulfonic acid group is used as the dopant, even when a water-soluble polymer having a relatively low electron withdrawing property such as a carboxy group coexists, in many cases, such a water-soluble polymer does not exhibit a function as a dopant. When the solid electrolyte layer contains such a water-soluble polymer, the insulating property of the polymer is appropriately exhibited. Further, the film thickness of the solid electrolyte layer can be increased and thus, a leakage current of the electrolytic capacitor can be reduced and thus, a withstand voltage can be enhanced. Accordingly, as the water-soluble polymer, it is preferable to use a water soluble polymer having the lower electron withdrawing property than a dopant. As such water-soluble polymer, for example, a water-soluble polymer having at least one selected from the group consisting of a carboxy group, a hydroxy group, and a polyoxyalkylene chain can be named.

Each of the carboxy group and the sulfonic acid group that the water-soluble polymer has may be contained in the first layer in a free form (—COOH), in an anion form (—COO⁻), or in a salt form as in the case of the dopant. A part of each of the carboxy group and the sulfonic acid group may be contained in the first layer in a form of bonding or interacting with the conductive polymer. In the present specification, the carboxy group in all these forms may be simply referred to as "carboxy group", and the sulfonic acid group in all these forms may be simply referred to as "sulfonic acid group".

An average molecular weight (Mw) of the water-soluble polymer is 100 or more, for example. It is preferable that the Mw of the water-soluble polymer be 400 or more. The Mw of the water-soluble polymer having higher withstand voltage characteristics is, for example, less than or equal to 5 million, and may be less than or equal to 1 million. The lower limit value and the upper limit value can be arbitrarily combined.

The content proportion of the water-soluble polymer in the first layer is preferably adjusted in such a range that the content proportion of the water-soluble polymer in the solid electrolyte layer is in a range from 25% by mass to 70% by mass, inclusive, for example. The content proportion of the water-soluble polymer in the solid electrolyte layer may be in a range from 30% by mass to 70% by mass, inclusive (or a range from 30% by mass to 68% by mass, inclusive), in a range from 40% by mass to 70% by mass, inclusive (or a range from 40% by mass to 68% by mass, inclusive), or in a range from 43% by mass to 70% by mass inclusive (or a range from 43% by mass to 68% by mass, inclusive). When the content proportion of the water-soluble polymer in the solid electrolyte layer is in such a range, a leakage current can be reduced while suppressing the increase in ESR and tan & of the electrolytic capacitor to a low level. Further, a higher withstand voltage can be secured.

The content proportion of water-soluble polymer in the first layer is preferably less than or equal to 30% by mass, and is more preferably less than or equal to 20% by mass, or less than or equal to 10% by mass. The first layer may not contain a water-soluble polymer. This is preferable because the solid electrolyte layer can secure higher conductivity.

The content proportion of the water-soluble polymer in the solid electrolyte layer can be obtained using a sample collected from the capacitor element. More specifically, first, the electrolytic capacitor is embedded in a curable resin, and then the curable resin is cured. By applying polishing treatment or cross section polishing working to the cured product, a cross section of the cured product parallel to the thickness direction of the solid electrolyte layer is exposed. The solid electrolyte layer is scraped from the cross section to collect a predetermined amount of the sample, and then a mass of the sample is measured. A water-soluble polymer is extracted from the sample using water at a temperature of 20° C. to 40° C. After the extract is concentrated, the water-soluble polymer is identified by Liquid Chromatography-Mass Spectrometry (LC-MS) or Gas Chromatography-Mass Spectrometry (GC-MS). The concentration of the water-soluble polymer in the extract is obtained by a calibration curve method. From this concentration and the mass of the sample, the content proportion (mass) of the water-soluble polymer in the solid electrolyte layer is obtained. The content proportion of the water-soluble polymer in the first layer is obtained by the same procedure as described above except that a sample that is collected by scraping the solid electrolyte layer formed in a pit of the anode body is used.

(Layer Containing Surface Conditioner)
(Surface Conditioner)

The surface conditioner includes a leveling agent and an antifoaming agent, for example. From the viewpoint of spreading the second treatment solution that contains the surface conditioner over the entire surface of the cathode forming portion of the anode body, the surface conditioner is preferably an agent having a leveling action. As the surface conditioner, a surfactant is suitably used.

The surfactant may be either a nonionic surfactant or an ionic surfactant. The surfactant has a hydrophilic group and a hydrophobic group. The ionic surfactant includes cationic surfactants, anionic surfactants, and amphoteric surfactants. One kind of surfactant may be used singly, or two or more kinds of surfactants may be used in combination.

As the nonionic surfactants, nonionic surfactants such as ether type (such as polyether type) surfactants, ester ether type (fatty acid polyethylene glycol, fatty acid polyoxyethylene sorbitan or the like) surfactants, ester type (glycerin fatty acid ester, sorbitan fatty acid ester, sucrose fatty acid ester, and the like) surfactants, alkanolamide type (such as fatty acid alkanolamide) surfactants and the like can be named. As the polyether type nonionic surfactant, surfactants having a polyoxyalkylene chain such as a polyoxyethylene chain (polyoxyethylene alkyl ether, polyoxyethylene alkylphenyl ether, polyoxyethylene polyoxypropylene glycol, or the like) and the like can be named. The nonionic surfactant may have halogen atoms. The halogen atoms include fluorine atoms, chlorine atoms, bromine atoms, and iodine atoms. Among these halogen atoms, it is preferable to use fluorine atoms.

As the cationic surfactant, cationic surfactants such as alkylamine salt type (monoalkylamine salt, dialkylamine salt, trialkylamine salt, etc.) surfactants, and quaternary ammonium salt type (alkyltrimethylammonium halide, dialkyldimethylammonium halide, alkylbenzalkonium chloride, and the like) surfactants can be named.

As the anionic surfactants, carboxylic acid type anionic surfactants, sulfonic acid type anionic surfactants, sulfuric acid ester type anionic surfactants, and phosphoric acid ester type anionic surfactants can be named. As the carboxylic acid type anionic surfactants, aliphatic monocarboxylates surfactants, polyoxyethylene alkyl ether carboxylates surfactants, N-acylsarcosinates surfactants, N-acylglutamate surfactants and the like can be named. As the sulfonic acid type anionic surfactants, dialkyl sulfosuccinates surfactants, alkane sulfonates surfactants, α-olefin sulfonates surfactants, alkyl benzene sulfonates surfactants, naphthalene sulfonate-formaldehyde condensation product surfactants, alkyl naphthalene sulfonates surfactants, N-methyl-N-acyl taurine salts surfactants and the like can be named. As the sulfuric acid ester-type anionic surfactants, alkyl sulfate surfactants, polyoxyethylene alkyl ether sulfate surfactants, oil-and-fat sulfate ester salt surfactants and the like can be named. As the phosphoric acid ester-type anionic surfactants, alkyl phosphates surfactants, polyoxyethylene alkyl ether phosphates surfactants, polyoxyethylene alkyl phenyl ether phosphates surfactants and the like can be named.

As the amphoteric surfactants, amphoteric surfactants such as carboxybetaine type (alkyl betaine, fatty acid amidopropyl betaine or the like) surfactants, 2-alkylimidazoline derivative type (2-alkyl-N-carboxymethyl-N-hydroxyethyl-imidazolium betaine or the like) surfactants, glycine type (alkyldiethylenetriaminoacetic acid, dialkyldiethylenetri-aminoacetic acid or the like) surfactants, and amine oxide type (alkylamine oxide and the like) surfactants and the like can be named.

When the nonionic surfactant is used, shortening of the pot life of the second treatment solution can be suppressed. Further, dedoping of the conductive polymer in the first layer and the second layer can be suppressed. From the viewpoint of promoting the adhesion of the second conductive polymer to the surface of the anode body more easily, a cationic surfactant or an amphoteric surfactant may be used. From the viewpoint of easily suppressing volatilization of a cationic agent described later, an anionic surfactant may be used.

The continuous or discontinuous layer that contains the surface conditioner may contain components other than the surface conditioner. A content proportion of the surface conditioner in the continuous or discontinuous layer ranges, for example, from 0.01% by mass to 30% by mass, inclusive, and may range from 0.1% by mass to 15% by mass, inclusive. By setting an content proportion of surface conditioner in such a range, the surface conditioner can be distributed over the entire surface of the cathode forming portion of the anode body more uniformly. Accordingly, nonuniformity in thickness of the solid electrolyte layer can be easily suppressed. Further, the resistance of the solid electrolyte layer can be suppressed to a low level and thus, an increase in ESR can be suppressed.

(Other Components)

As components that are contained in the continuous or discontinuous layer other than the surface conditioner, for example, at least one selected from the group consisting of a cationic agent and an anionic agent can be named. Here, both the cationic agent and the anionic agent are different from the surface conditioner. For example, as the cationic agent and the anionic agent, agents that are not surfactants are used.

Usually, each of the first layer and the second layer contains anionic dopants together with the conductive polymer, and these dopants are likely to be present on the surface of each of the first layer and the second layer. That is, since both of the surfaces of the first layer and the second layer are negatively charged, it is difficult to form the second layer on the surface of the first layer. When the continuous or discontinuous layer that is interposed between the first layer and the second layer contains a cationic agent, the film-forming property or covering property of the second layer can be enhanced.

When the continuous or discontinuous layer contains an anionic agent, the film repairability of the dielectric layer can be enhanced.

In order to sufficiently obtain the effect of the cationic agent, it is preferable that the cationic agent be sufficiently dissociated in the second treatment solution. However, since the cationic agent has low solubility and high volatility, it is difficult to increase the content of the cationic agent in the continuous or discontinuous layer. From the viewpoint of promoting the dissociation of the cationic agent, it is preferable to use the second treatment solution that contains both the cationic agent and the anionic agent. The continuous or discontinuous layer obtained using such a second treatment solution contains both a cationic agent and an anionic agent.

(Cationic Agent)

The cationic agent having a cationic group is not particularly limited as long as cations can be generated in a dissociated state. The cationic agent may be, for example, a metal compound (an inorganic base such as a metal hydroxide). Meanwhile, the cationic agent may preferably be an organic compound (an organic base). As the cationic group of the cationic agent that is an organic compound, an amino group (a primary amino group, a secondary amino group, a tertiary amino group, and the like) and a quaternary ammonium group can be preferably used. Such cationic groups also include salts of amino groups, salts of quaternary ammonium groups, and the like. The continuous or discontinuous layer that contains the surface conditioner may contain one kind of cationic agent or two or more kinds of cationic agents.

Among the cationic agents, cationic agents having an amino group as a cationic group (such as amine compounds and the like) can be preferably used. As an amine compound, amines (primary to tertiary amines) having 1 to 3 substituents at a nitrogen atom, and a diamine that may have 1 or 2 alkyl groups at a nitrogen atom can be exemplified. The substituent is selected from the group consisting of an alkyl group, a cycloalkyl group, and an aryl group, for example. Each of the alkyl group, the cycloalkyl group, and the aryl group may further have a substituent (for example, at least one substituent selected from the group consisting of a hydroxy group and an alkoxy group).

As diamine described above, diaminoalkanes, diaminocycloalkanes (diamino $C_{5-8}$ cycloalkanes such as diaminocyclohexane), and diaminoarenes (diamino $C_{6-14}$ arene such as diaminobenzene, or diaminonaphthalene) can be exemplified. As diaminoalkane, diamino $C_{2-14}$ alkane and diamino $C_{4-12}$ alkane and the like can be named. As specific examples of diaminoalkane, 1,4-diaminobutane, 1,6-diaminohexane, 1,8-diaminooctane, and 1,10-diaminodecane can be named.

As the amine, at least one selected from the group consisting of a primary amine to a tertiary amine may be used. As the tertiary amine, N, N-di$C_{1-10}$ alkyl-N—$C_{4-16}$ alkylamine, N, N-di$C_{4-16}$ alkyl-N—$C_{1-10}$ alkylamine, tri$C_{4-16}$ alkylamine and the like can be named.

The continuous or discontinuous layer (alternatively, the second treatment solution) that contains the surface conditioner may contain a cationic agent in any form of an amine compound, a cation corresponding to an amine compound, a quaternary ammonium compound, or a salt of a cation. For example, in a continuous or discontinuous layer (alternatively, the second treatment solution), a cationic agent may form a salt with an anionic agent.

(Anionic Agent)

As an anionic agent, for example, at least one selected from the group consisting of an anion and a polyanion which are exemplified as a dopant in the first layer may be used. Meanwhile, from the viewpoint of suppressing dedoping from the first layer and the second layer, as an anionic agent, it is preferable to use a dopant different from the dopant of the first layer and the dopant of the second layer. From substantially the same point of view, as the anionic agent, a dopant having lower electron withdrawing properties than the dopant of the first layer and the dopant of the second layer may be used.

From the viewpoint of suppressing corrosion of the valve metal that forms the anode body, it may be possible to use an anionic agent that contains both a first anionic group having high electron withdrawing properties and a second anionic group having lower electron withdrawing properties than the first anion. As such an anionic agent, for example, a polymer (a first anionic agent) that contains a first anionic group and a second anionic group can be named. The first anionic agent can be used singly, or two or more kinds of first anionic agents can be used in combination.

As the first anionic group and the second anionic group, for example, a sulfonic acid group, a phosphoric acid group, a phosphonic acid group, a boric acid group, a carboxy group, a hydroxy group and the like can be named. Among these anionic groups, the first anionic group and the second anionic group that have different electron withdrawing properties may be selected. The anionic group is not particularly limited as long as the anionic group can generate anions in a dissociated state. A salt of these groups or the like can be also used.

As the first anionic agent which is a polymer (polymer compound), for example, a copolymer (p1) that contains at least a monomer unit having a first anionic group and a monomer unit having a second anionic group, a polymer (p2) that contains at least a monomer unit having a first anionic group and a second anionic group, and the like can be exemplified. These polymerizabilities may further provide other copolymerizable monomer units. One kind of first anionic agent may be used singly, or two or more kinds of first anionic agent may be used in combination.

As the monomer unit that becomes a base of the above-described monomer units, for example, an aliphatic vinyl monomer unit such as ethylene or propylene, an aromatic vinyl monomer unit such as styrene, or a diene monomer unit such as a butadiene or isoprene, and the like can be named.

The weight-average molecular weight (Mw) of the polymer ranges, for example, from 5,000 to 500,000, inclusive, and may range from 10,000 to 200,000, inclusive.

When necessary, the first anionic agent may be used in combination with a second anionic agent which is a low molecular compound (monomer compound) having an anionic group.

As the second anionic agent, for example, a monomer compound may be used out of an anion and a polyanion that are described as dopants in the first layer. The second anionic agent may be any one of an aliphatic compound, an alicyclic compound, and an aromatic compound. The second anionic agent may be used singly, or two or more kinds of second anionic agents may be used in combination.

As the second anionic agent, for example, an aliphatic sulfonic acid (a $C_{1-6}$ alkanesulfonic acid such as a methanesulfonic acid or the like), an alicyclic sulfonic acid (a $C_{5-8}$ cycloalkanesulfonic acid such as a cyclohexanesulfonic acid or the like), an aromatic sulfonic acid (a $C_{6-14}$ arenesulfonic acid such as a benzenesulfonic acid and a styrenesulfonic acid or the like), acid phosphoxypolyoxyalkylene glycol monoacrylate (acidphosphoxypolyoxyethylene glycol mono (meth) acrylate ($P(=O)(OH)_2$—($O$—$CH_2CH_2)_n$—$O$—$C(=O)$—$CR=CH_2$) (n: integer of 2 to 10, and R: a hydrogen atom or a methyl group), for example) of a carboxylic acid such as acid phosphoxyethyl acrylate or acid phosphoxyethyl methacrylate, an aliphatic phosphonic acid (a vinyl phosphonic acid or the like), an aromatic phosphonic acid (a phenyl phosphonic acid or the like), carboxylic acid [an aliphatic carboxylic acid ($C_{2-10}$ alkane carboxylic acids such as a propanoic acid, a butanoic acid, and a hexanoic acid, $C_{4-12}$ alkane dicarboxylic acids such as a hexanedioic acid or the like), an alicyclic carboxylic acid (carboxy $C_{5-8}$ cycloalkane such as carboxycyclohexane, dicarboxy $C_{5-8}$ cycloalkane such as cyclohexanedicarboxylic acid, etc.), aromatic carboxylic acid (Carboxy $C_{6-14}$ arene such as benzoic acid, carboxyhydroxy $C_{6-14}$ arene such as a salicylic acid, dicarboxy $C_{6-14}$ arene such as a phthalic acid, an isophthalic acid, a terephthalic acid, and a naphthalenedicarboxylic acid or the like), and the like], a phenol compound (phenol, hydroxytoluene, vinylphenol, hydroxyvinyltoluene, or the like), hydroxyalkyl ester of a carboxylic acid (hydroxy $C_{1-4}$ alkyl esters such as hydroxyethyl acrylate, hydroxyethyl methacrylate or the like), and the like can be exemplified.

As the second anionic agent, an anionic agent having two or more kinds of anionic groups may be used. As such a second anionic agent, for example, a second anionic agent having a sulfonate group and a carboxy group (for example, an aliphatic compound (a sulfosuccinic acid or the like), an aromatic compound (a sulfobenzoic acid, a sulfosalicylic acid, a disulfosalicylic acid, a sulfophthalic acid, a sulfoisophthalic acid, a sulfoterephthalic acid, a naphtholsulfonic acid or the like), a second anionic agent having a phosphate group and a carboxy group (for example, a 2-(dihydroxyphosphinyloxy) acrylic acid), and a second anionic agent having a phosphonate group and a carboxy group (for example, a phosphonoacrylic acid, a 2-methyl-3 phosphonoacrylic acid) and the like can be named.

In the continuous or discontinuous layer (alternatively, the second treatment solution) that contains the surface conditioner, an anionic group of an anionic agent may be contained in any form selected from the anionic group described above, an anion corresponding to the above-mentioned anionic group, and a salt of the anion.

(Second Layer)

It is sufficient that the second layer be formed so as to cover at least a part of the first layer. The second layer may be formed so as to cover the entire surface of the first layer. In at least a partial region of the surface of the first layer, the second layer is formed so as to cover the first layer with a continuous or discontinuous layer that contains a surface conditioner and is interposed between the first layer and the second layer. Meanwhile, a region may exist where the second layer is directly formed on the surface of the first layer without interposing the continuous or discontinuous layer. In the region where the first layer and the continuous or discontinuous layer are not formed, the second layer may be brought into contact with the dielectric layer. That is, the second layer may be formed so as to cover the dielectric layer.

(Second Conductive Polymer)

As the second conductive polymer that is contained in the second layer, a known polymer used in an electrolytic capacitor can be used. Specifically, such a polymer can be appropriately selected from the conductive polymers exemplified with respect to the first conductive polymer. A weight-average molecular weight (Mw) of the second conductive polymer can also be appropriately selected from the range exemplified with respect to the first conductive polymer. The same conductive polymer or different conductive polymers may be used for forming the first conductive polymer and the second conductive polymer.

The second layer may be formed of a single layer or may be formed of a plurality of layers. When the second layer is formed of the plurality of layers, the second conductive polymers included in the respective layers may be formed of the same layer or may be formed of different layers.

The second layer may further contain a dopant. As the dopant, a known dopant used in an electrolytic capacitor can be used. Specifically, a dopant can be appropriately selected from the dopants exemplified with respect to the first layer. The same dopant may be used both in the first layer and the second layer. Alternatively, the different dopants may be used between the first layer and the second layer.

The dopant may be contained in the second layer in the form of a salt. In the second layer, the dopant may form a conductive polymer composite together with the second conductive polymer. In the same manner as the first layer, an anionic group of the dopant may be contained in the second layer in an organic form, in an anion form, or in a salt form. The anionic group of the dopant may be contained in the second layer in a form that the anionic group is bonded to the conductive polymer or interacts with the conductive polymer.

A content ratio of a dopant in the second layer preferably ranges from 10 parts by mass to 1,000 parts by mass, inclusive, more preferably from 50 parts by mass to 200 parts by mass, inclusive, with respect to 100 parts by mass of the second conductive polymer.

The second layer may further contain a water-soluble polymer. As for the water-soluble polymer, the description with respect to the water-soluble polymer in the first layer can be referenced. The content proportion (% by mass) of the water-soluble polymer in the second layer is preferably adjusted in such a range that the content proportion (% by mass) of the water-soluble polymer in the solid electrolyte layer falls within the above-mentioned range. When the second layer contains a water-soluble polymer, the effect of increasing the thickness of the solid electrolyte layer at the center portion of the anode body can be easily obtained. Accordingly, the effect of reducing a leakage current and the effect of increasing a withstand voltage can be further enhanced. Thus, it is preferable that at least the second layer contain a water-soluble polymer. The content proportion (% by mass) of the water-soluble polymer in the second layer may be a range that is described as the content proportion (% by mass) of the water-soluble polymer in the solid electrolyte layer. The content proportion of the water-soluble polymer in the second layer is obtained by substantially the same procedure as the procedure for obtaining the content proportion of the water-soluble polymer in the solid electrolyte layer except that a sample that is collected by scraping the solid electrolyte layer in the vicinity of the surface layer of the solid electrolyte layer is used.

(Others)

In the cross section G of the capacitor element at any arbitrary position in a first end side portion of the cathode part, which is perpendicular to the length direction of the capacitor element, the ratio T1/T2 is, for example, equal to or more than 0.8, may be equal to or more than 0.9 or more. Further, the ratio T1/T2 may be may be equal to or more than 1, or more than 1. When the ratio T1/T2 is within such a range, the decrease in thickness of the solid electrolyte layer at the corner portions can be suppressed. Accordingly, the occurrence of product defects caused by short-circuiting can be suppressed. In particular, when the ratio T1/T2 is equal to or more than 1, the effect of reducing the leakage current is enhanced. Thus, the occurrence of product defects due to the leakage current can be suppressed. The ratio T1/T2 is, for example, less than or equal to 1.7. The ratio T1/T2 may be less than or equal to 1.5, or may be less than or equal to 1.4. When the ratio T1/T2 is within such ranges, the lowering of electrostatic capacitance, the increase of equivalent series resistance (ESR) and the increase of a dielectric dissipation factor tan δ are also suppressed. Accordingly, the quality of the electrolytic capacitor is further stabilized. An upper limit value and a lower limit value of the T1/T2 can be arbitrarily combined.

According to this disclosure, the thickness of the solid electrolyte layer formed at the corner portion of the anode body can be set large compared to the thickness of the solid electrolyte layer formed in an area in the vicinity of the center of the principal surface. Although the detail reason why such a phenomenon occurs is not yet clarified, it is considered that such a phenomenon would occur by the following mechanism. First, with the use of the second treatment solution that contains the surface conditioner, the second treatment solution can be spread over the entire surface of the cathode forming portion of the anode body. In general, as for a liquid droplet, a volatilization rate of a liquid medium is faster at an edge of the liquid droplet than a center portion of the liquid droplet. Accordingly, components other than the liquid medium tend to remain at the edge. Such a phenomenon is also referred to as a coffee ring effect or a ring stain effect. Due to such a phenomenon, as for a coated film made of the second treatment solution formed over the entire surface of the cathode forming portion, the volatilization of the liquid medium from the corner portion proceeds faster than that from an area in the vicinity of the center of the principal surface of the anode body. Accordingly, a large amount of components in the second treatment solution other than the liquid medium remain on the surface of the corner portion. As a result, it is considered that a large amount of the component of the third treatment solution adheres to the corner portion of the cathode forming portion of the anode body, so that the second conductive polymer is easily aggregated at the corner portion. For example, the ratio T1/T2 can be set greater than 1 by adjusting a kind and the concentration of a surface conditioner, a kind of a liquid medium used as the second treatment solution, a drying condition of a coating film formed of the second treatment solution, and the like.

The average thickness of the solid electrolyte layer may be in a range from 5 μm to inclusive, for example. Alternatively, the average thickness of the solid electrolyte layer may be in a range from 10 μm to 15 μm, inclusive.

The average thickness of the solid electrolyte layer is obtained by measuring the thicknesses at a plurality of arbitrary positions (for example, 10 locations) in a cross section that passes the center of the cathode part in a direction parallel to the length direction of the capacitor element, and is perpendicular to the length direction of the capacitor element, and by averaging the measured thicknesses.

The first layer and the second layer may, when necessary, respectively further contain a known additive agent and a known conductive material other than the conductive polymer (for example, a conductive inorganic material such as manganese dioxide and/or a TCNQ complex salt).

A layer that enhances adhesiveness or the like may be interposed between the dielectric layer and the first layer.

Figure 1:
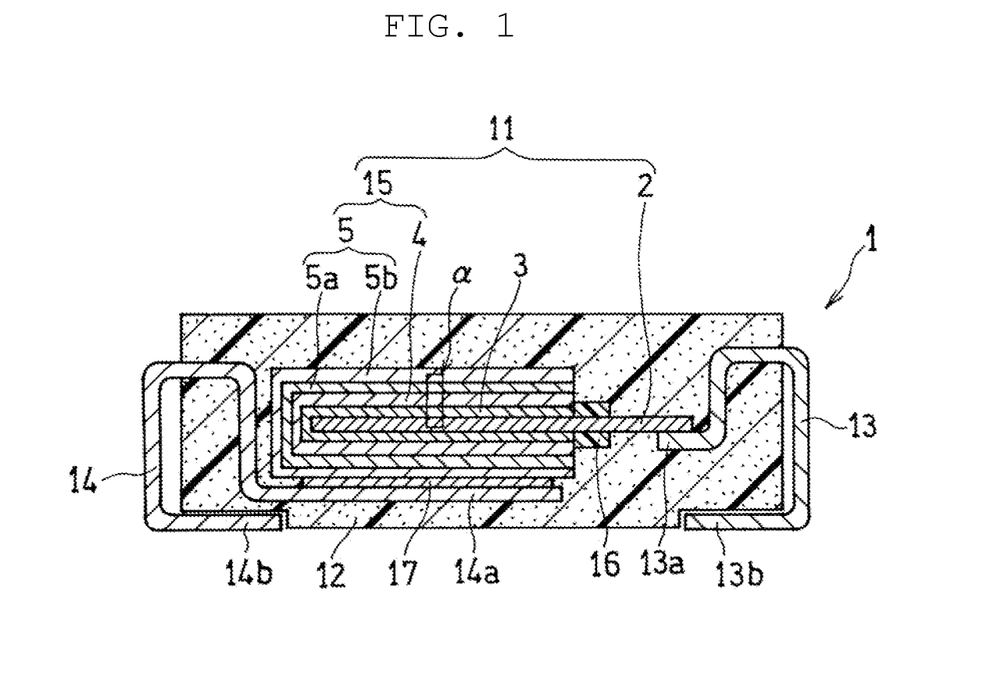
FIG. 1 is a schematic cross-sectional view of an electrolytic capacitor according to one exemplary embodiment of the present disclosure.
Figure 2:
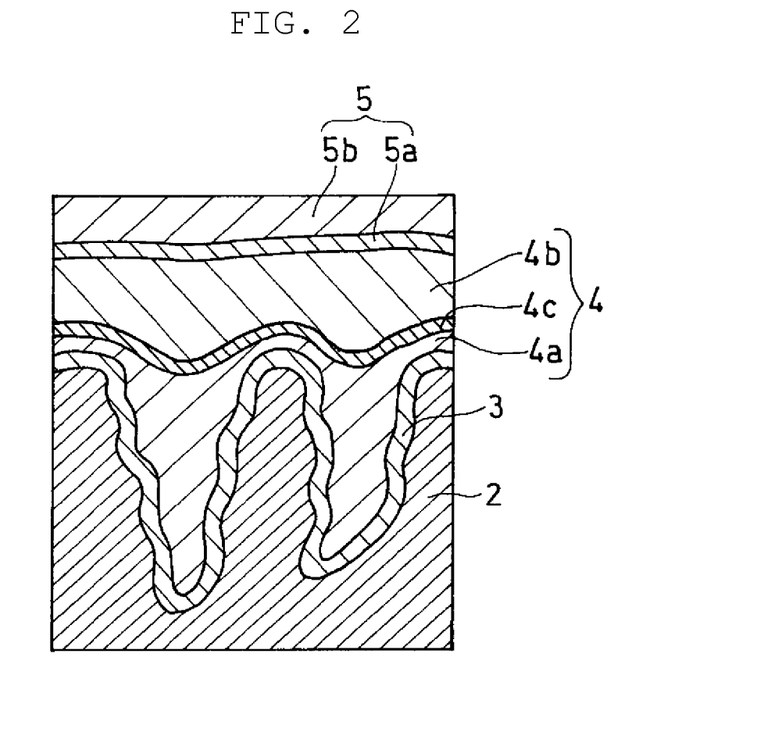
FIG. 2 is an enlarged view of an area surrounded by a solid line a in FIG. 1.

FIG. 1 is a schematic cross-sectional view of an electrolytic capacitor according to an exemplary embodiment of the present disclosure. FIG. 2 is an enlarged view conceptually illustrating a region surrounded by a solid line a in FIG. 1.

Electrolytic capacitor 1 includes capacitor element 11, resin exterior body 12 that seals capacitor element 11, and anode terminal 13 and cathode terminal 14 that are exposed to the outside of resin exterior body 12. Capacitor element 11 includes sheet-shaped anode body 2, dielectric layer 3 that covers a second end side of anode body 2, and cathode part 15 that covers dielectric layer 3. A portion of anode body 2 where cathode part 15 is formed is a cathode forming portion, and a portion where cathode part 15 is not formed is an anode lead portion. Anode terminal 13 is electrically connected to a first end of the anode lead portion of the anode body 2. Cathode terminal 14 is electrically connected to cathode part 15. Resin exterior body 12 has an almost rectangular parallelepiped outer shape. Electrolytic capacitor 1 correspondingly has a substantially rectangular parallelepiped outer shape.

Anode body 2 and cathode part 15 face each other with dielectric layer 3 interposed between anode body 2 and cathode part 15. Cathode part 15 includes solid electrolyte layer 4 that covers dielectric layer 3, and cathode layer 5 that covers solid electrolyte layer 4. Cathode layer 5 illustrated in the drawings has a two-layer structure. That is, cathode layer 5 has: carbon layer 5a that is brought into contact with solid electrolyte layer 4; and metal paste layer 5b that covers a surface of carbon layer 5a.

With respect to the anode lead portion of anode body 2 that protrudes from cathode part 15, on a region of the anode lead portion on a cathode part 15 side, separation portion 16 having insulating property is formed so as to cover a surface of anode body 2 in a strip shape. Separation portion 16 prevents cathode part 15 and anode body 2 from coming into contact with each other. The first end of anode body 2 that protrudes from cathode part 15 is electrically connected to one end 13a of anode terminal 13 by welding or the like. Meanwhile, cathode layer 5 formed as an outermost layer of cathode part 15 is electrically connected to one end 14a of cathode terminal 14 via conductive adhesive 17 (for example, a mixture of a thermosetting resin and metal particles). The other end 13b of anode terminal 13 and the other end 14b of cathode terminal 14 are drawn out from different side surfaces of resin exterior body 12, and both ends extend to one principal flat face (a lower surface in FIG. 1) in an exposed state. The exposed portions of the respective terminals on the flat face are used for, for example, connection by soldering with a substrate (not illustrated in the drawings) on which electrolytic capacitor 1 is to be mounted.

Dielectric layer 3 is formed on a part of a surface of a conductive material that forms anode body 2. Specifically, dielectric layer 3 can be formed by anodizing a surface of a conductive material for forming anode body 2. Accordingly, dielectric layer 3 is formed along a surface (including inner wall surfaces of pores or pits of an inner surface) of anode body 2 as illustrated in FIG. 2.

First layer 4a that contains first conductive polymer is formed so as to cover dielectric layer 3. Second layer 4b that contains the second conductive polymer is formed so as to cover first layer 4a. Layer 4c that contains a surface conditioner is interposed between first layer 4a and second layer 4b. In the illustrated example, layer 4c that includes a surface conditioner is formed so as to cover first layer 4a. Second layer 4b is formed so as to cover layer 4c that contains a surface conditioner. In FIG. 2, layer 4c that includes the surface conditioner is formed as a continuous layer. Meanwhile, the present disclosure is not limited to such a case. Layer 4c that includes the surface conditioner may be a discontinuous layer. In such capacitor element 11, it is possible to suppress the decrease in the thickness of solid electrolyte layer 4 formed at corner portions of anode body 2. Accordingly, the nonuniformity in thickness of solid electrolyte layer 4 can be suppressed.

It is not necessary for first layer 4a to cover the entirety (entire surface) of dielectric layer 3. It is sufficient that first layer 4a be formed so as to cover at least a part of dielectric layer 3. Meanwhile, it is preferable that first layer 4a cover as large region of dielectric layer 3 as possible. In the same manner, it is not necessary for each of second layer 4b and layer 4c that contains the surface conditioner to cover the entirety (entire surface) of first layer 4a. It is sufficient that each of second layer 4b and layer 4c be formed so as to cover at least a part of first layer 4a. Meanwhile, each of second layer 4b and layer 4c is preferably formed so as to cover as large region of first layer 4a as possible.

Dielectric layer 3 is formed along the surface of anode body 2 and thus, irregularities are formed on a surface of dielectric layer 3 in accordance with a shape of the surface of anode body 2. First layer 4a is preferably formed so as to fill such irregularities formed on dielectric layer 3.

In the configuration described above, anode body 2 is an anode member of capacitor element 11, and first layer 4a, second layer 4b, and cathode layer 5 are each a cathode member of capacitor element 11. Dielectric layer 3 is a dielectric member of capacitor element 11.

In the exemplary embodiment described above, capacitor element 11 includes two layers consisting of first layer 4a and second layer 4b each containing the conductive polymer. Meanwhile, capacitor element 11 may include three or more layers each containing the conductive polymer. In this case, one layer or two or more layers each containing conductive polymer may be formed between first layer 4a and second layer 4b. For example, one or more layers each containing conductive polymer may be formed at least one of between first layer 4a and layer 4c that contains a surface conditioner and between layer 4c that contains a surface conditioner and second layer 4b.

In the electrolytic capacitor of the present disclosure, the ratio T1/T2 of the thickness T1 of the solid electrolyte layer formed at the corner portion of the anode body to the thickness T2 of the solid electrolyte layer formed at center portion of the principal surface of the anode body can be set to a large value compared to the prior art as described above.

Figure 3:
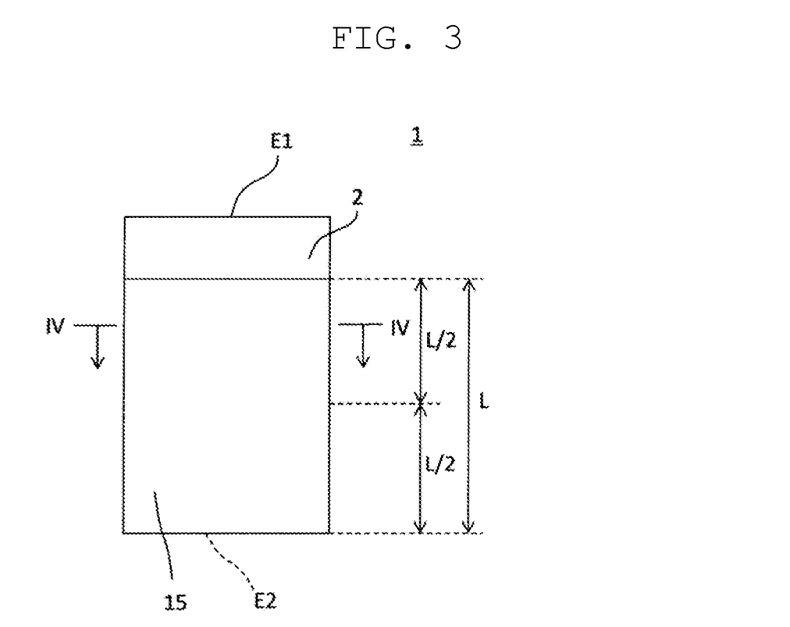
FIG. 3 is a schematic front view of the capacitor element as viewed from one principal surface side.
Figure 4:
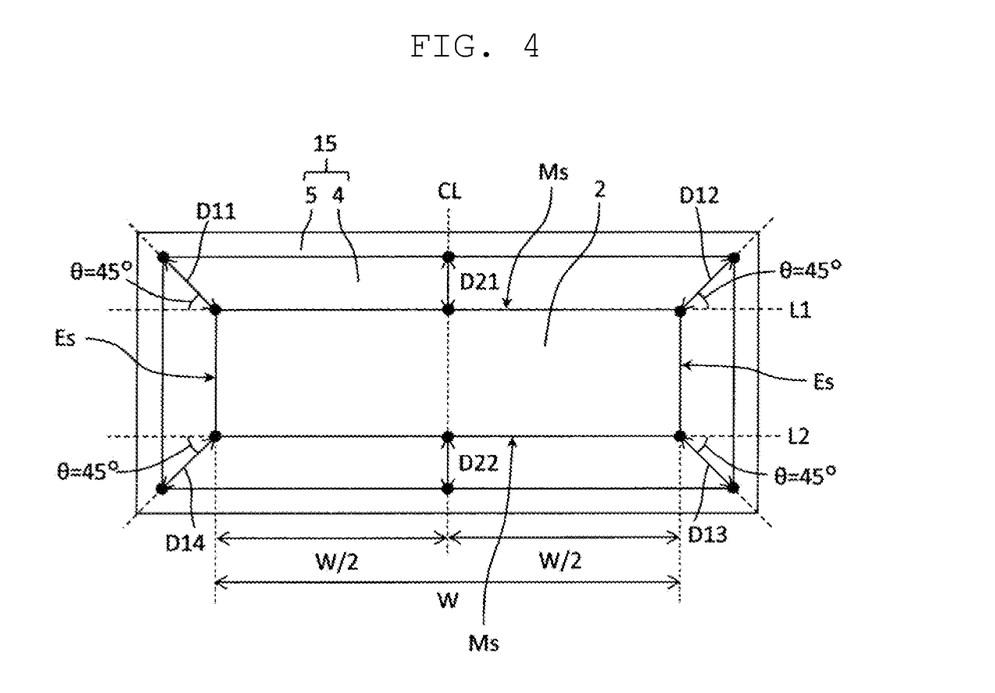
FIG. 4 is a schematic cross-sectional view of the capacitor element taken along line IV-IV in FIG. 3 as viewed in a direction of an arrow.

FIG. 3 is a schematic front view of the capacitor element as viewed from one principal surface side. FIG. 4 is a schematic cross-sectional view of the capacitor element taken along line IV-IV in FIG. 3 when the cross section (cross section G) is viewed in a direction of an arrow. Thicknesses T1 and T2 of the solid electrolyte layer are obtained, for example, by the following steps.

Ratio T1/T2 is obtained in cross section G of cathode part 15, which is perpendicular to the direction from first end E1 to second end E2 of capacitor element 11 (also referred to as the length direction of anode body 2 or the length direction of capacitor element 11). In this exemplary embodiment, cross section G is formed at an arbitrary position in a first end E1 side portion of 2 cathode part 15. The first end E1 side portion of cathode part 15 is, assuming a length of cathode part 15 in the length direction of capacitor element 11 as L, a portion from an end of cathode part 15 at side close to the first end E1 to a position away from the end of cathode part 15 by a length of L/2. In FIG. 3, the first end E1 side portion of cathode part 15 corresponds to an upper half portion of cathode part 15.

FIG. 4 illustrates cross section G of the first end E1 side portion of cathode part 15, which is perpendicular to the length direction of capacitor element 11 taken along line IV-IV. The line IV-IV corresponds to a position arbitrarily selected in the first end E1 side portion of cathode part 15. In FIG. 4, hatching for indicating a cross section is omitted.

In the above-mentioned cross section G, a pair of principal surfaces Ms of sheet-shaped anode body 2, and a pair of end surfaces Es positioned at ends of the pair of principal surfaces Ms are seen. A corner portion exists between each principal surface Ms and each end surface Es and thus, four corner portions can be confirmed in the above-mentioned cross section G of anode body 2. Imaginary straight lines L1 and L2 are drawn by extending lines that correspond to respective principal surfaces Ms toward the outside. A straight line that passes the vertex of each corner portion is drawn at an angle of 45° with the straight line L1 or L2. The distance D11, D12, D13, or D14 between a point where the straight line intersects with an outer periphery of solid electrolyte layer 4 and the vertex of the corresponding corner portion is defined as the thicknesses of solid electrolyte layer 4 at the corresponding corner portion. Then, T1 is obtained by averaging the values of these four distances (D11, D12, D13, D14).

In the above-mentioned cross section G, assuming a width of anode body 2 that corresponds to a length of a line segment that corresponds to principal surface Ms as W, center line CL is drawn at a position of W/2 from respective end surfaces Es. Center line CL passes middle points of the line segments that correspond to respective principal surfaces Ms of anode body 2. Then, distance D21 or D22 between the middle point of the line segment and an intersecting point at which the center line CL and outer periphery of solid electrolyte layer 4 intersect with each other is defined as the thickness of the solid electrolyte layer formed at the center portion of corresponding principal surface Ms. T2 is obtained by averaging the values of these two distances (D21, D22).

[Method for Producing Electrolytic Capacitor]

A method for producing an electrolytic capacitor of one exemplary embodiment of this disclosure includes: a first step of preparing an anode body; a second step of forming a dielectric layer on a surface of the anode body; a third step of treating the anode body, on which the dielectric layer is formed, with a first treatment solution that contains a first conductive polymer or a precursor of the first conductive polymer; a fourth step of treating the anode body, which is already treated by the first treatment solution, with a second treatment solution containing a surface conditioner; and a fifth step of treating the anode body, which is already treated by the second treatment solution, with a third treatment solution containing a second conductive polymer.

Hereinafter, the respective steps are described in more detail.

(First Step)

In the first step, an anode body is formed by a known method according to a kind of anode body.

The anode body is prepared, for example, by forming a porous portion on at least a surface layer of a part corresponding to at least the cathode forming portion. The porous portion may be formed on the entire surface layer of the anode body, or the porous portion may be formed on the entire anode body.

The porous portion can be formed by, for example, roughening a surface of a sheet-shaped base material made of a conductive material containing a valve metal. It is sufficient for roughening that irregularities can be formed on the surface of the base material. For example, roughening may be performed by etching the surface of the base material. Alternatively, roughening may be performed by depositing particles made of a conductive material containing a valve metal on the surface of the base material using a gas phase method such as a vapor deposition method. Etching is performed using a known technique such as electrolytic etching. For example, a predetermined masking member is disposed on the surface of the anode lead portion and, then, roughening is performed to form the porous portion on the surface layer of the cathode forming portion. The masking member is not particularly limited. The masking member may be an insulator such as a resin, or may be a conductor that contains a conductive material.

A sintered body obtained by sintering particles that contain a valve metal may be used as the anode body.

(Second Step)

In the second step, the dielectric layer is formed on the anode body. The dielectric layer is formed by anodizing a surface of the anode body. By performing anodizing, the valve metal that exists on at least the surface of the anode body is oxidized to form an oxide of the valve metal.

The anodizing can be performed by a known method such as an anodizing treatment. Meanwhile, in anodizing, it is sufficient that an oxide of the valve metal is formed. Thus, anodizing is not limited to the anodizing treatment.

For example, the anodizing treatment can be performed by immersing the anode body in an anodizing solution such that an anodizing solution is impregnated into a surface (inner wall surfaces of pores or pits on a more inner surface) of the anode body, and by applying a voltage between the anode body that functions as an anode and a cathode that is immersed in the anodizing solution. As the anodizing solution, for example, an aqueous solution of a phosphoric acid, an aqueous solution of ammonium phosphate, or an aqueous solution of ammonium adipate and the like may be preferably used.

(Third Step)

In the third step, it is sufficient that the first treatment solution be brought into contact with at least the dielectric layer. In the third step, for example, it is possible to bring the first treatment solution into contact with at least the dielectric layer by immersing the anode body on which the dielectric layer is formed in the first treatment solution, or by injecting the first treatment solution into the anode body on which the dielectric layer is formed. By impregnation or injection of the first treatment solution, the first treatment solution may be impregnated into the surfaces of the anode body on which the dielectric layer is formed (inner wall surfaces of pores or pits on a more inner surface on which the dielectric layer is formed). The method for bringing the first treatment solution into contact with the dielectric layer is not limited to the impregnation or the injection. A known coating method (for example, a spray coating method) or a printing method may be used. These methods may be combined with each other when necessary.

When the first treatment solution that contains a precursor of a first conductive polymer is used, it is preferable to generate the first conductive polymer by immersing the anode body and by polymerizing the precursor by chemical polymerization or electrolytic polymerization. The anode body is usually dried after being taken out from the first treatment solution. During the drying, the anode body may be heated when necessary. The anode body taken out from the first treatment solution may be washed prior to drying when necessary. In this manner, the first layer that contains the first conductive polymer is formed.

When the first treatment solution that contains the first conductive polymer is used, for example, the first treatment solution is brought into contact with at least the dielectric layer of the anode body and, then, is dried. In this manner, the first layer that contains the first conductive polymer is formed. During the drying, the anode body may be heated when necessary.

The first treatment solution is prepared by dissolving or dispersing components of the first treatment solution in a liquid medium. As the constituent components, for example, a first conductive polymer or a precursor of the first conductive polymer, a dopant, a water-soluble polymer, an additive agent and the like can be named. With respect to the first conductive polymer, the dopant, and the water-soluble polymer, the description of the first layer can be referenced.

As the precursor of the first conductive polymer, monomers, oligomers, prepolymers and the like of the first conductive polymer can be named. The first treatment solution may contain one kind of precursor or two or more kinds of precursors.

The first treatment solution may contain one kind of first conductive polymer, or may contain two or more kinds of first conductive polymers. The first treatment solution may contain one kind of dopant, or may contain two or more kinds of dopants. The first treatment solution may contain one kind of water-soluble polymer, or may contain two or more kinds of water-soluble polymers.

As the liquid medium contained in the first treatment solution, water, an organic medium, and a mixture of water and the organic medium can be exemplified. As the organic medium, for example, aliphatic alcohols; aliphatic ketones such as acetone; nitriles such as acetonitrile and benzonitrile; amides such as N,N-dimethylformamide; sulfoxides such as dimethyl sulfoxide and the like can be named. As the aliphatic alcohol, an aliphatic alcohol having 1 to 5 carbon atoms is preferably used. The aliphatic alcohol may be either monool or polyol. As the aliphatic monool, for example, methanol, ethanol, propanol, butanol can be named. As the aliphatic polyol, ethylene glycol, glycerin and the like can be named.

The first treatment solution can contain a known additive agent used in forming the solid electrolyte layer. As such an additive agent, a silane compound may be used.

When the first treatment solution that contains the precursor of the first conductive polymer is used, an oxidizing agent is used to polymerize the precursor. The oxidizing agent may be contained in the first treatment solution as an additive agent. Alternatively, the oxidizing agent may be applied by coating to the anode body before or after the first treatment solution is brought into contact with the anode body on which the dielectric layer is formed. As such an oxidizing agent, a sulfate, a sulfonic acid, and a salt of the sulfonic acid can be named. One kind of oxidizing agent can be used singly, or two or more kinds of oxidizing agents can be used in combination.

As the sulfate, for example, a salt of metal and a sulfuric acid such as ferric sulfate or sodium persulfate or a sulfuric acid group such as persulfuric acid can be named. As the metal that forms a salt, for example, alkali metals such as sodium and potassium, iron, copper, chromium, zinc and the like can be named. A sulfonic acid or a salt of a sulfonic acid has a function as a dopant in addition to a function as an oxidizing agent. As a sulfonic acid or a salt of a sulfonic acid, a low molecular sulfonic acid or a salt of a low molecular sulfonic acid exemplified as the dopant can be used.

The step of forming the first layer by immersion of the anode body in the first treatment solution and polymerization (or drying) may be performed once. Meanwhile, the step may be repeated a plurality of times. In respective times, with respect to the conditions such as the composition and the viscosity of the first treatment solution, the same conditions may be used, or at least one condition may be changed.

(Fourth Step)

The fourth step can be performed, for example, by bringing a second treatment solution that contains a surface conditioner into contact with the anode body treated with the first treatment solution. After the anode body is brought into contact with the second treatment solution, the anode body may be dried when necessary. During the drying, the anode body may be heated when necessary.

In the fourth step, adhesion of the second treatment solution may be made to cover the first conductive polymer that adheres to the surface of the dielectric layer. From the viewpoint of more uniformly forming the second layer on the entire surface of at least the cathode forming portion of the anode body, it is preferable to make the second treatment solution adhere to the anode body such that a surface conditioner is distributed on at least the entire surface of the cathode forming portion.

Substantially in the same manner as the case where the first treatment solution is applied, the second treatment solution is applied to the surface of the anode body using at least one selected from the group consisting of immersion, injection, coating, and printing, for example.

The second treatment solution may contain a liquid medium. As the liquid medium, for example, the liquid medium exemplified with respect to the first treatment solution can be named.

The second treatment solution may contain at least one selected from the group consisting of a cationic agent and an anionic agent.

As the component contained in the second treatment solution, the description of the continuous or discontinuous layer that contains the surface conditioner can be referenced.

A content proportion of a surface conditioner in the second treatment solution is in a range, for example, from 0.01% by mass to 5% by mass, inclusive, or may also be in a range from 0.05% by mass to 2.5% by mass, inclusive. By setting a content proportion of surface conditioner in such a range, the surface conditioner can be distributed over the entire surface of the cathode forming portion of the anode body more uniformly. Accordingly, the nonuniformity in thickness of the solid electrolyte layer can be easily suppressed. Further, the resistance of the solid electrolyte layer can be suppressed to a low level and thus, an increase in ESR can be suppressed. The content proportion of the surface conditioner in the second treatment solution is a concentration of the surface conditioner in the second treatment solution.

A proportion of the surface conditioner in a dry solid content in the second treatment solution is selected from the range described with respect to the content proportion of the surface conditioner in the continuous or discontinuous layer that contains the surface conditioner.

In the present specification, the proportion of the surface conditioner in the dry solid content in the second treatment solution is used in the same context with a proportion of the surface conditioner in the components other than the liquid medium in the second treatment solution.

As described above, it is preferable that the second treatment solution not contain a conductive polymer.

(Fifth Step)

The fifth step can be performed substantially in the same manner as the third step except that the anode body treated with the second treatment solution is used, and a third treatment solution that contains the second conductive polymer (dopants and/or water-soluble polymer when necessary) is used in place of the first treatment solution. As the third treatment solution, it is possible to use the treatment solution described with respect to the first treatment solution except that the third treatment solution contains the second conductive polymer in place of the first treatment solution. The second layer that contains the second conductive polymer is formed in the fifth step. In a state after the fourth step, the components contained in the second treatment solution such as the surface conditioner are distributed over the entire surface of at least the cathode forming portion of the anode body. By treating the surface of the cathode forming portion with the third treatment solution in such a state, it is possible to make the second conductive polymer adhere to the entire surface of the cathode forming portion including the corner portions. When the third treatment solution contains the water-soluble polymer, the effect of suppressing nonuniformity in the thickness of the solid electrolyte layer is enhanced. Accordingly, a leakage current of the electrolytic capacitor can be suppressed to a low level, and a high withstand voltage can be obtained.

(Step of Forming Cathode Layer)

The method for producing an electrolytic capacitor can further include a step of forming a cathode layer (sixth step).

In the sixth step, for example, the cathode layer is formed by sequentially laminating the carbon layer and the metal paste layer over the surface of the anode body obtained in the fifth step.

The carbon layer can be formed by immersing the anode body including the dielectric layer, on which the second layer is formed, in a dispersion liquid that contains conductive carbon, or by applying a paste that contains conductive carbon to the surface of the second layer. As the conductive carbon, for example, graphite such as artificial graphite and natural graphite are used. As the dispersion liquid and the paste, for example, one obtained by dispersing conductive carbon in an aqueous liquid medium is used.

The metal paste layer can be formed, for example, by laminating a composition that contains metal particles on the surface of the carbon layer. As the metal paste layer, for example, a silver-paste layer formed using a composition that contains silver particles and a resin (a binder resin) can be used. As the resin, although a thermoplastic resin can be used, a thermosetting resin such as an imide resin or an epoxy resin is preferably used.

The configuration of the cathode layer is not limited to such a configuration, and it is sufficient for the cathode layer to have a current collecting function.

The cathode terminal is connected to the cathode layer. For example, with respect to the cathode terminal, a conductive adhesive is applied by coating to the cathode layer, and the cathode terminal is bonded to the cathode layer via the conductive adhesive.

(Step of Sealing Capacitor Element)

The capacitor element formed in the above-described manner is sealed using an exterior body. More specifically, a material resin (for example, an uncured thermosetting resin and a filler) for forming the capacitor element and the exterior body are accommodated in a mold, and the capacitor element is sealed by the exterior body using a transfer molding method, a compression molding method, or the like. In such an operation, a part of the anode terminal connected to the anode lead and a part of the cathode terminal both drawn out from the capacitor element are respectively exposed from the mold. Conditions of molding are not particularly limited. In consideration of a temperature for curing a thermosetting resin to be used and the like, conditions on time and temperature should be set as desired.

Examples

Hereinafter, the present disclosure will be specifically described based on examples and comparative examples. However, the present disclosure is not limited to the following examples.

<<Electrolytic Capacitor A1>>

Electrolytic capacitor 1 illustrated in FIG. 1 was produced in the following manner, and characteristics of electrolytic capacitor 1 were evaluated.

(1) Step of Preparing Anode Body 2 (First Step)

Both surfaces of an aluminum foil (thickness: 100 μm) that forms a base material was roughened by etching. As a result, anode body 2 was prepared.

(2) Step of Forming Dielectric Layer 3 (Second Step)

A portion of anode body 2 on a second end side was immersed in an anodizing liquid, and a direct current voltage of 70V was applied to anode body 2 for 20 minutes. As a result, a dielectric layer 3 that contains aluminum oxide was formed.

(3) Step of Forming First Layer 4a (Third Step)

3,4-ethylenedioxythiophene monomer was added to an aqueous solution of a polystyrenesulfonic acid (Mw: 75,000) under stirring, and then an oxidizing agents (iron (III) sulfate and sodium persulfate) were added to the aqueous solution so as to carry out the chemical oxidation polymerization. The obtained polymerization solution was subjected to filtration by an ion-exchange device so as to remove impurities. As a result, a solution that contains poly 3,4-ethylenedioxythiophene (PEDOT) that forms the first conductive polymer and polystyrenesulfonic acid (PSS) that forms a dopant was obtained.

Pure water was added to the obtained solution, and the mixture was homogenized by a high-pressure homogenizer and was further subjected to filtration by a filter. As a result, a first treatment solution in a state of a dispersion liquid was prepared.

Anode body 2 on which dielectric layer 3 was formed in the above-described step (2) was immersed in the first treatment solution. Then, anode body 2 was taken out from the first treatment solution and, then, was dried at a temperature of 120° C. for 10 minutes to 30 minutes. Immersion of anode body 2 in the first treatment solution and drying of anode body 2 were repeated one time respectively. As a result, first layer 4a that contains a first conductive polymer was formed so as to cover a surface of dielectric layer 3.

(4) Step of Forming Layer 4c that Contains Surface Conditioner (Fourth Step)

An ester-type nonionic surfactant (a surface conditioner), N, N-dimethyloctylamine (a cationic agent), and a copolymer (an anionic agent) of a styrenesulfonic acid and acid phosphoxyethyl acrylate (P(=O)(OH)$_2$—O—CH$_2$CH$_2$—O—C(=O)—CH=CH$_2$) were dissolved in pure water so as to prepare a second treatment solution. A content proportion of the surface conditioner in the second treatment solution was set to 0.5% by mass. The concentration of the cationic agent in the second treatment solution was set to 0.05 mol/L, and the concentration of the anionic agent in the second treatment solution was set to 0.03 mol/L. A proportion of the surface conditioner in the whole components except water that is a liquid medium contained in the second treatment solution was 12.5% by mass.

Anode body 2 treated in the above-described step (3) was immersed in the second treatment solution, then was taken out, and further was dried at a temperature of 100° C. for 3 minutes. As a result, layer 4c that contains a surface conditioner was formed so as to cover the surface of first layer 4a.

The anionic agent used in the second treatment solution was produced as follows.

Sodium styrene sulfonate and acid phosphoxyethyl acrylate were added to a predetermined amount of pure water and were mixed with the pure water. As a result, a monomer solution was prepared. In performing such treatment, sodium styrenesulfonate and acid phosphoxyethyl acrylate were used at a ratio that a copolymerization ratio (a molar ratio) between a styrenesulfonic acid and acid phosphoxyethyl acrylate in a copolymer becomes 75:25. A predetermined amount of ammonium persulfate (an oxidizing agent) was added to the monomer solution under stirring, and a polymerization reaction was performed over 8 hours. Pure water and an ion exchange resin were added to the obtained polymerization liquid, stirred, and filtered to perform a purification treatment. This purification treatment was repeated a plurality of times to finally obtain the above-described copolymer. The molecular weight of the copolymer was measured by GPC, and Mw was found to be 83,000.

(5) Step of Forming Second Layer 4b (Fifth Step)

A third treatment solution having the same composition as the composition of the first treatment solution used in the above (3) was used. Anode body 2 treated in the above (4) was immersed in the third treatment solution, was taken out from the third treatment solution, and further was dried at 120° C. for 10 minutes to 30 minutes. The immersion in the third treatment solution and the drying were alternately repeated another two times to form second layer 4b that contains the second conductive polymer such that second layer 4b covers a surface of layer 4c that contains a surface conditioner.

In this manner, solid electrolyte layer 4 that includes first layer 4a, layer 4c that contains the surface conditioner, and second layer 4b was formed so as to cover the surface of dielectric layer 3.

(6) Step of Forming Cathode Layer 5 (Sixth Step)

Anode body 2 obtained in the above (5) was immersed in a dispersion liquid in which graphite particles were dispersed in water, was taken out from the dispersion liquid, and was dried to form carbon layer 5a on a surface of at least second layer 4b. Drying was carried out at a temperature ranging from 130° C. to 180° C. for 10 minutes to 30 minutes.

Then, a silver paste that contains silver particles and a binder resin (an epoxy resin) was applied onto a surface of carbon layer 5a by coating, and the layer coated with the silver paste and the binder resin were heated at a temperature ranging from 150° C. to 200° C. for a period ranging for 10 minutes to 60 minutes to cure the binder resin. As a result, metal paste layer 5b was formed. Thus, cathode layer 5 that was formed of carbon layer 5a and metal paste layer 5b was formed.

In accordance with the steps as described above, capacitor element 11 was prepared.

(7) Assembly of Electrolytic Capacitor

In capacitor element 11 that was obtained in the above (6), cathode layer 5 was joined with one end 14a of cathode terminal 14 by conductive adhesive 17. The first end of anode body 2 that protruded from capacitor element 11 was joined with one end 13a of anode terminal 13 by laser welding.

Next, resin exterior body 12 formed of an insulating resin was formed around capacitor element 11 by a transfer molding method. In such a step, the other end 13b of anode terminal 13 and the other end 14b of cathode terminal 14 were drawn out from resin exterior body 12.

Thus, electrolytic capacitor 1 (A1) was completed. In the same manner as described above, 20 pieces of electrolytic capacitors 1 in total were prepared.

(8) Evaluation

The following evaluations were performed using the electrolytic capacitors.

(a) Thickness Ratio T1/T2 of Solid Electrolyte Layer 4

Thickness ratio T1/T2 of solid electrolyte layer 4 in each electrolytic capacitor was obtained in accordance with the procedure described above. Then, an average value obtained by averaging ratios T1/T2 of 20 pieces of electrolytic capacitors was obtained.

(b) Initial Electrostatic Capacitance, Tan δ, and ESR

Under an environment of 20° C., using an LCR meter for 4 terminal measurement, an initial electrostatic capacitance value (μF) and an initial tan δ at a frequency of 120 kHz of each electrolytic capacitor were measured, and an initial ESR (mΩ) at a frequency of 100 kHz of each electrolytic capacitor was measured. Then, an average value of the 20 pieces of electrolytic capacitors was obtained.

(c) Leakage Current (LC)

A resistor of 1 kΩ resistor was connected to the electrolytic capacitor in series, and a leakage current (μA) was measured after a rated voltage of 25 V was applied to the electrolytic capacitor for 1 minute by a DC power source. Then, an average value of the measured values of 20 pieces of the electrolytic capacitors was obtained.

<<Electrolytic Capacitor B1>>

In the fourth step, the surface conditioner was not used in preparing the second treatment solution. Electrolytic capacitor B1 was prepared in the same manner as electrolytic capacitor A1 except the above-described processing, and the evaluation of electrolytic capacitor B1 was performed.

<<Electrolytic Capacitor B2>>

In the fifth step, the same ester type nonionic surfactant (surface conditioner) as the surfactant used in the second treatment solution in electrolytic capacitor A1 was added to the third treatment solution. A content proportion of the surface conditioner in the third treatment solution was set to 0.5% by mass. In the fourth step, a surface conditioner was not used in preparing the second treatment solution. Electrolytic capacitor B2 was prepared in the same manner as electrolytic capacitor A1 except the above-described processing, and the evaluation of electrolytic capacitor B2 was performed.

<<Electrolytic Capacitors A2 and A3>>

In the fourth step, commercially available nonionic surfactants all of which are different from the surfactant used in electrolytic capacitor A1 were used as the surface conditioner. Electrolytic capacitors A2, A3 were prepared in the same manner as electrolytic capacitor A1 except the above-described processing, and the evaluation of electrolytic capacitors A2, A3 was performed. Different nonionic surfactants were used between electrolytic capacitor A2 and electrolytic capacitor A3. The nonionic surfactant used in electrolytic capacitor A2 was an ester type, and the nonionic surfactant used in electrolytic capacitor A3 was a linear alkyl polyether type.

The results of electrolytic capacitors A1 to A3 and B1 and B2 are shown in Table 1. Each evaluation was expressed as a ratio (%) when the measured value in electrolytic capacitor A1 was assumed as 100%. Electrolytic capacitors A1 to A3 are examples, and electrolytic capacitors B1 and B2 are comparative examples.

TABLE 1

| | Ratio T1/T2 | Electrostatic capacity (%) | tanδ (%) | ESR (%) | LC (%) |
|---|---|---|---|---|---|
| B1 | 0.552 | 102 | 86.7 | 97 | 274 |
| B2 | 0.769 | 101 | 93.3 | 90 | 281 |
| A1 | 1.280 | 100 | 100 | 100 | 100 |
| A2 | 0.932 | 107 | 86.7 | 87 | 496 |
| A3 | 0.969 | 107 | 93.3 | 85 | 408 |

As shown in Table 1, in electrolytic capacitor B1 that does not use the surface conditioner and electrolytic capacitor B2 that uses the third treatment solution containing the surface conditioner, ratio T1/T2 was at a low value of 0.552 to 0.769. On the other hand, in electrolytic capacitors A1 to A3 that use the second treatment solution containing the surface conditioner, ratio T1/T2 was 0.932 to 1.280. This implies that ratio T1/T2 was remarkably improved as compared with electrolytic capacitors B1 and B2. The values of T2 in electrolytic capacitors A1 to A3 were not significantly different from the values of T2 in electrolytic capacitors B1 and B2. Accordingly, in electrolytic capacitors A1 to A3, it is possible to suppress decrease in the thickness of the solid electrolyte layer formed at the corner portions of the anode body compared to electrolytic capacitors B1 and B2. As a result, it is considered that nonuniformity in thickness of the solid electrolyte layer is suppressed.

In particular, in electrolytic capacitor A1, the thickness of the solid electrolyte layer at the corner portion was increased. Accordingly, a leakage current can be remarkably reduced while maintaining favorable levels with respect to electrostatic capacitance, tan δ, and ESR.

In electrolytic capacitors A2 and A3, excellent results were obtained with respect to electrostatic capacitance, tan δ, and ESR while suppressing an excessive increase in leakage current.

The greater T1/T2, the lower the risk of product defects due to the occurrence of short-circuiting becomes. Hence, in electrolytic capacitors A1 to A3, the occurrence of product defects due to the occurrence of short-circuiting can be suppressed as compared with electrolytic capacitors B1 and B2.

<<Electrolytic Capacitor A4 to A8>>

A treatment solution that was prepared by further adding a water-soluble polymer to a dispersion liquid having the same composition as the composition of the first treatment solution was used as a third treatment solution. Electrolytic capacitors A4 to A8 were prepared substantially in the same manner as electrolytic capacitor A1 except the above-described processing, and the evaluation of electrolytic capacitors A4 to A8 was performed. In the third treatment solution, an addition amount of the water-soluble polymer was adjusted such that the content proportion (% by mass) of the water-soluble polymer in the solid electrolyte layer takes a value shown in Table 2. As the water-soluble polymer, a copolymer of an acrylic acid and a methacrylic acid (Mw: about 100,000) was used.

With respect to electrolytic capacitors A4 to A8, A1 and B1, a withstand voltage was evaluated in accordance with the following steps.

(Withstand Voltage)

A breakdown withstand voltage was measured in such a manner that a voltage was applied to the electrolytic capacitor while increasing a voltage at a rate of 1.0 V/s, and a breakdown withstand voltage at which an overcurrent of 0.5 A flows was measured. A breakdown withstand voltage was expressed as an index (a withstand voltage index V) on a condition that a breakdown withstand voltage of electrolytic capacitor A1 was set to 100(%). The withstand voltage was evaluated based on this withstand voltage index. The table shows that the greater the withstand voltage index, the higher the withstand voltage becomes.

The results are shown in Table 2. Electrolytic capacitors A4 to A8 are examples.

TABLE 2

| | Content of water-soluble polymer (% by mass) | Ratio T1/T2 | Electro-static capacity (%) | tanδ (%) | ESR (%) | LC (%) | Withstand voltage (%) |
|---|---|---|---|---|---|---|---|
| B1 | 0 | 0.552 | 102 | 86.7 | 97 | 274 | 83 |
| A1 | 0 | 1.280 | 100 | 100 | 100 | 100 | 100 |
| A4 | 30 | 0.835 | 99.6 | 104.1 | 106.6 | 66.2 | 101.4 |
| A5 | 43 | 0.864 | 99.1 | 107.0 | 90.3 | 82.2 | 114.0 |
| A6 | 56 | 0.930 | 99.3 | 98.6 | 91.0 | 73.4 | 127.0 |
| A7 | 63 | 0.898 | 97.4 | 100.9 | 100.9 | 60.7 | 126.3 |
| A8 | 68 | 1.049 | 97.6 | 97.8 | 97.8 | 58.1 | 137.6 |

As shown in Table 2, when the solid electrolyte layer contains a water-soluble polymer, high withstand voltage can be obtained (electrolytic capacitors A4 to A8). In electrolytic capacitors A4 to A8, LC can be greatly reduced while suppressing an increase in tan δ and ESR. In electrolytic capacitors A4 to A8, ratio T1/T2 was improved as compared with electrolytic capacitor B1 (and B2 in Table 1). The values of T1 in electrolytic capacitors A4 to A8 were not significantly different from the value of T1 in electrolytic capacitor A1. Accordingly, in electrolytic capacitors A4 to A8, thickness T2 of the solid electrolyte layer formed at the center portion of the principal surface of the anode body was increased compared to electrolytic capacitor A1. As a result, it is considered that nonuniformity in thickness of the solid electrolyte layer is further suppressed. As a result, it is considered that, in electrolytic capacitors A4 to A8, LC was greatly reduced, and a high withstand voltage was obtained.

According to the present disclosure, nonuniformity in thickness of the solid electrolyte layer can be suppressed and thus, short-circuiting defects can be reduced, and a high-quality electrolytic capacitor can be provided. Hence, the electrolytic capacitor can be used in various applications.

The invention claimed is:

1. An electrolytic capacitor comprising at least one capacitor element, the at least one capacitor element including:
   an anode body having a sheet shape, the anode body including an anode lead portion and a cathode forming portion;
   a dielectric layer disposed on at least a surface of the cathode forming portion of the anode body; and
   a cathode part covering at least a part of the dielectric layer, wherein:
   the anode body includes a first end and a second end,
   the anode lead portion includes the first end,
   the cathode forming portion includes the second end,
   the cathode part includes a solid electrolyte layer containing a conductive polymer, the solid electrolyte layer covering at least a part of the dielectric layer,
   a ratio T1/T2 of a thickness T1 of the solid electrolyte layer formed at a corner portion of the anode body to a thickness T2 of the solid electrolyte layer formed at a center portion of a principal surface of the anode body is more than or equal to 0.835 and less than 1.0 in a cross section of the at least one capacitor element at an arbitrary position in a first end side portion of the cathode part, the cross section being perpendicular to a direction directed from the first end to the second end,
   the solid electrolyte layer further contains a water-soluble polymer,
   the water-soluble polymer is at least one selected from the group consisting of a polyalkylene glycol compound, a water-soluble polyurethane, a water-soluble polyamide, a water-soluble polyimide, a water-soluble acrylic resin, and polyvinyl alcohol,
   the solid electrolyte layer includes:
     a first layer that contains a first conductive polymer, the first layer covering at least a part of the dielectric layer;
     a second layer that contains a second conductive polymer, the second layer covering at least a part of the first layer; and
     at least one continuous or discontinuous layer disposed between the first layer and the second layer,
   the at least one continuous layer or the discontinuous layer contains a surface conditioner,
   the at least one continuous or discontinuous layer further contains at least one selected from the group consisting of a cationic agent and an anionic agent, the cationic agent containing a cationic group, the anionic agent containing an anionic group, and
   the cationic agent and the anionic agent are different from the surface conditioner.

2. The electrolytic capacitor according to claim 1, wherein at least the second layer contains the water-soluble polymer.

3. The electrolytic capacitor according to claim 1, wherein a content proportion of the water-soluble polymer in the solid electrolyte layer is in a range from 25% by mass to 70% by mass, inclusive.

4. The electrolytic capacitor according to claim 1, wherein the surface conditioner includes at least one kind of surfactant selected from the group consisting of a nonionic surfactant, a cationic surfactant, an anionic surfactant, and an amphoteric surfactant.

5. The electrolytic capacitor according to claim 1, wherein a content proportion of the surface conditioner in the at least one continuous or discontinuous layer is in a range from 0.01% by mass to 30% by mass, inclusive.

6. A method for producing an electrolytic capacitor that includes at least one capacitor element including an anode body, the method comprising:
   a first step of preparing the anode body;
   a second step of forming a dielectric layer on a surface of the anode body;
   a third step of treating the anode body with a first treatment solution that contains a first conductive polymer or a precursor of the first conductive polymer, the anode body having the dielectric layer;
   a fourth step of treating the anode body with a second treatment solution containing a surface conditioner, the anode body being already treated by the first treatment solution; and
   a fifth step of treating the anode body with a third treatment solution containing a second conductive polymer, the anode body being already treated by the second treatment solution, wherein:
   in the third step, the fourth step, and the fifth step, a cathode part including a solid electrolyte layer is formed to cover at least a part of the dielectric layer, the solid electrolyte layer containing the first conductive polymer and the second conductive polymer,
the anode body includes a first end and a second end,
a ratio T1/T2 of a thickness T1 of the solid electrolyte layer formed at a corner portion of the anode body to a thickness T2 of the solid electrolyte layer formed at a center portion of a principal surface of the anode body is more than or equal to 0.835 and less than 1.0 in a cross section of the at least one capacitor element at an arbitrary position in a first end side portion of the cathode part, the cross section being perpendicular to a direction directed from the first end to the second end,
the third treatment solution further contains a water-soluble polymer,
the water-soluble polymer is at least one selected from the group consisting of a polyalkylene glycol compound, a water-soluble polyurethane, a water-soluble polyamide, a water-soluble polyimide, a water-soluble acrylic resin, and polyvinyl alcohol,
the second treatment solution further contains at least one selected from the group consisting of a cationic agent and an anionic agent, the cationic agent containing a cationic group, the anionic agent containing an anionic group, and
the cationic agent and the anionic agent are different from the surface conditioner.

7. The method for producing an electrolytic capacitor according to claim 6, wherein the surface conditioner includes at least one surfactant selected from the group consisting of a nonionic surfactant, a cationic surfactant, an anionic surfactant, and an amphoteric surfactant.

8. The method for producing an electrolytic capacitor according to claim 6, wherein a content proportion of the surface conditioner in the second treatment solution is in a range from 0.01% by mass to 5% by mass, inclusive.

9. An electrolytic capacitor comprising at least one capacitor element, the at least one capacitor element including:
an anode body having a sheet shape, the anode body including an anode lead portion and a cathode forming portion;
a dielectric layer disposed on at least a surface of the cathode forming portion of the anode body; and
a cathode part covering at least a part of the dielectric layer, wherein:
the anode body includes a first end and a second end,
the anode lead portion includes the first end,
the cathode forming portion includes the second end,
the cathode part includes a solid electrolyte layer containing a conductive polymer, the solid electrolyte layer covering at least a part of the dielectric layer,
a ratio T1/T2 of a thickness T1 of the solid electrolyte layer formed at a corner portion of the anode body to a thickness T2 of the solid electrolyte layer formed at a center portion of a principal surface of the anode body is in a range from 0.8 to 1.7, inclusive, in a cross section of the at least one capacitor element at an arbitrary position in a first end side portion of the cathode part, the cross section being perpendicular to a direction directed from the first end to the second end,
the solid electrolyte layer includes:
a first layer that contains a first conductive polymer, the first layer covering at least a part of the dielectric layer;
a second layer that contains a second conductive polymer, the second layer covering at least a part of the first layer; and
at least one continuous or discontinuous layer disposed between the first layer and the second layer,
the at least one continuous layer or the discontinuous layer contains a surface conditioner,
the at least one continuous or discontinuous layer further contains at least one selected from the group consisting of a cationic agent and an anionic agent, the cationic agent containing a cationic group, the anionic agent containing an anionic group, and
the cationic agent and the anionic agent are different from the surface conditioner.

10. The electrolytic capacitor according to claim 9, wherein the ratio T1/T2 is in a range from 0.9 to 1.5, inclusive.

11. The electrolytic capacitor according to claim 9, wherein the ratio T1/T2 is greater than 1.

12. A method for producing an electrolytic capacitor, the method comprising:
a first step of preparing an anode body;
a second step of forming a dielectric layer on a surface of the anode body;
a third step of treating the anode body with a first treatment solution that contains a first conductive polymer or a precursor of the first conductive polymer, the anode body having the dielectric layer;
a fourth step of treating the anode body with a second treatment solution containing a surface conditioner, the anode body being already treated by the first treatment solution; and
a fifth step of treating the anode body with a third treatment solution containing a second conductive polymer, the anode body being already treated by the second treatment solution, wherein:
the second treatment solution further contains at least one selected from the group consisting of a cationic agent and an anionic agent, the cationic agent containing a cationic group, the anionic agent containing an anionic group, and
the cationic agent and the anionic agent are different from the surface conditioner.

13. The method for producing an electrolytic capacitor according to claim 12, wherein the surface conditioner includes at least one surfactant selected from the group consisting of a nonionic surfactant, a cationic surfactant, an anionic surfactant, and an amphoteric surfactant.

14. The method for producing an electrolytic capacitor according to claim 12, wherein a content proportion of the surface conditioner in the second treatment solution is in a range from 0.01% by mass to 5% by mass, inclusive.

15. The method for producing an electrolytic capacitor according to claim 12, wherein:
the third treatment solution further contains a water-soluble polymer, and
the water-soluble polymer is at least one selected from the group consisting of a polyalkylene glycol compound, a water-soluble polyurethane, a water-soluble polyamide, a water-soluble polyimide, a water-soluble acrylic resin, and polyvinyl alcohol.

* * * * *